United States Patent
Chaurasia et al.

(10) Patent No.: US 11,451,758 B1
(45) Date of Patent: Sep. 20, 2022

(54) SYSTEMS, METHODS, AND MEDIA FOR COLORIZING GRAYSCALE IMAGES

(71) Applicant: Meta Platforms Technologies, LLC, Menlo Park, CA (US)

(72) Inventors: Gaurav Chaurasia, Zurich (CH); Alexander Sorkine Hornung, Zurich (CH); David Novotny, London (GB); Nikola Dodik, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 28 days.

(21) Appl. No.: 16/789,019

(22) Filed: Feb. 12, 2020

(51) Int. Cl.
| | |
|---|---|
| *G06K 9/46* | (2006.01) |
| *G06K 9/62* | (2022.01) |
| *H04N 13/15* | (2018.01) |
| *G06T 7/90* | (2017.01) |
| *H04N 13/133* | (2018.01) |
| *G06N 20/00* | (2019.01) |
| *H04N 13/00* | (2018.01) |

(52) U.S. Cl.
CPC ............ *H04N 13/15* (2018.05); *G06N 20/00* (2019.01); *G06T 7/90* (2017.01); *H04N 13/133* (2018.05); *G06T 2207/20081* (2013.01); *H04N 2013/0077* (2013.01)

(58) Field of Classification Search
CPC ...... G06K 9/623; G06K 9/46; G06T 2207/20; G06T 7/143; G06T 11/001
See application file for complete search history.

(56) References Cited

U.S. PATENT DOCUMENTS

| | | | | |
|---|---|---|---|---|
| 5,710,877 | A * | 1/1998 | Marimont | G06T 11/00 |
| | | | | 345/427 |
| 9,576,367 | B2 * | 2/2017 | You | G06T 7/74 |
| 9,836,839 | B2 * | 12/2017 | Champlin | G06V 20/698 |
| 10,124,257 | B2 | 11/2018 | Stafford | |

(Continued)

FOREIGN PATENT DOCUMENTS

| | | |
|---|---|---|
| EP | 2660643 A2 | 11/2013 |
| EP | 3163407 A1 | 5/2017 |

(Continued)

OTHER PUBLICATIONS

Synthesis Lectures on Artificial Intelligence and Machine Learning; Grauman—2011 (Year: 2011).*

(Continued)

*Primary Examiner* — Luis Perez-Fuentes
(74) *Attorney, Agent, or Firm* — Baker Botts L.L.P.

(57) ABSTRACT

In one embodiment, a computing system may access a first grayscale image and a second grayscale image. The system may generate a first color image and a second color image based on the first grayscale image and the second grayscale image, respectively. The system may generate affinity information based on the first grayscale image and the second grayscale image, the affinity information identifying relationships between pixels of the first grayscale image and pixels of the second grayscale image. The system may modify the color of the first color image and the second color image based on the affinity information. The system may generate a first visual output based on the modified first color image and a second visual output based on the modified second color image.

20 Claims, 15 Drawing Sheets

(56) References Cited

U.S. PATENT DOCUMENTS

| | | | |
|---|---|---|---|
| 10,817,749 B2* | 10/2020 | Biswas | G06N 3/08 |
| 10,997,752 B1* | 5/2021 | Yoo | G06T 11/001 |
| 11,158,091 B2* | 10/2021 | Panetta | G06T 7/143 |
| 2003/0034974 A1 | 2/2003 | Welch | |
| 2012/0092328 A1 | 4/2012 | Flaks | |
| 2013/0005467 A1 | 1/2013 | Kim | |
| 2013/0093788 A1 | 4/2013 | Liu | |
| 2015/0235610 A1 | 8/2015 | Miller | |
| 2016/0163028 A1* | 6/2016 | Xu | G06T 5/007 382/118 |
| 2017/0287215 A1 | 10/2017 | Lalonde | |
| 2017/0365100 A1 | 12/2017 | Walton | |
| 2018/0067316 A1 | 3/2018 | Lee | |
| 2018/0068488 A1 | 3/2018 | Hart | |
| 2018/0088323 A1 | 3/2018 | Bao | |
| 2018/0232056 A1 | 8/2018 | Nigam | |
| 2018/0364801 A1 | 12/2018 | Kim | |
| 2019/0101758 A1 | 4/2019 | Zhu | |
| 2019/0197765 A1 | 6/2019 | Molyneaux | |
| 2019/0213789 A1 | 7/2019 | Uyyala | |
| 2019/0220002 A1 | 7/2019 | Huang | |
| 2019/0243448 A1 | 8/2019 | Miller | |
| 2020/0020166 A1 | 1/2020 | Menard | |
| 2020/0026922 A1 | 1/2020 | Pekelny | |
| 2020/0334908 A1 | 10/2020 | Wilson | |
| 2021/0201071 A1* | 7/2021 | Liao | G06T 11/001 |

FOREIGN PATENT DOCUMENTS

| | | |
|---|---|---|
| GB | 2376397 A | 12/2002 |
| WO | WO 2017/079657 | 5/2017 |

OTHER PUBLICATIONS

A heuristic method for gray images pseudo coloring with histogram and RGB layers; 2011. (Year: 2011).*

Heuristic threshold for Histogram-based Binarization of Grayscale Images; Joo; 2014. (Year: 2014).*

Stereo Matching with Color and Monochrome Cameras in Low-Light Conditions; Hae; 2016. (Year: 2016).*

Rendering grayscale image using color feature; Chen—2008. (Year: 2008).*

Heuristic threshold for Histogram-based Binarization of Grayscale Images; 2014. (Year: 2014).*

A heuristic method for gray images pseudo coloring with histogram & RGB layers; 2011. (Year: 2011).*

Stereo Matching with Color and Monochrome Cameras in Low-Light Cond; 2016 (Year: 2016).*

Ballan, et al., Unstructured Video-Based Rendering: Interactive Exploration of Casually Captured Videos, ACM Trans. Graph. (Proc. SIGGRAPH) 29, Article 87, Issue 4, 11 pages, Jul. 2010.

Chaurasia, et al., Depth Synthesis and Local Warps for Plausible Image-based Navigation, ACM Trans Graph 32, 3, Article 30, 12 pages, Jun. 2013.

Chaurasia, et al., Silhouette-Aware Warping for Image-Based Rendering. Comput. Graph. Forum (Proc. EGSR)30, 4 (2011), pp. 1223-1232, 2011.

Chen, QuickTime VR—An Image-Based Approach to Virtual Environment Navigation. In ACM SIGGRAPH 1995 Conference Proceedings, pp. 29-38, 1995.

Chen, et al., View Interpolation for Image Synthesis, In ACM SIGGRAPH 1993 Conference Proceedings, pp. 279-288, 1993.

Fanello, et al., Low Compute and Fully Parallel Computer Vision with HashMatch, In the IEEE International Conference on Computer Vision (ICCV), pp. 1-11, 2017.

Gu, et al., Application of Motion Vector in Live 3D Object Reconstruction, Patterns 2011: The Third International Conferences on Pervasive Patterns and Applications, pp. 41-46, 2011.

Hedman, et al., Casual 3D Photography, ACM Transactions on Graphics, Article 234, 36(6):1-15, 2017.

Hedman, et al., Instant 3D Photography, ACM Transactions on Graphics, Article 101, 37(4):1-12, Aug. 2018.

Hirschmuller, et al., Memory Efficient Semi-Global Matching, ISPRS Annals of the Photogrammetry, Remote Sensing and Spatial Information Sciences, vol. 1-3, 2012 XXII ISPRS Congress, Melbourne, Australia, pp. 371-376, Sep. 2012.

Hirschmuller, et al., Stereo Processing by Semiglobal Matching and Mutual Information, IEEE Transactions on Pattern Analysis and Machine Intelligence, 30(2):328-341, Feb. 2008.

Holynski, et al., Fast Depth Densification for Occlusion-aware Augmented Reality, ACM Transactions on Graphics, Article 194, 37(6):1-11, Nov. 2018.

Hornung, et al., Interactive Pixel-Accurate Free Viewpoint Rendering from Images with Silhouette Aware Sampling, Computer Graphics, 0(1981): 1-13, 2009.

Kanade, et al., A Stereo Machine for Video-rate Dense Depth Mapping and Its New Applications, Proceedings of 15th Computer Vision and Pattern Recognition Conference (CVPR), San Francisco, pp. 1-7, Jun. 1996.

Kang, et al., Extracting View-Dependent Depth Maps from a Collection of Images, International Journal of Computer Vision 58(2):139-163, 2004.

Levin, et al., Colorization using Optimization, The Hebrew University of Jerusalem, ACM 0733-0301/04/01)00-0689, pp. 689-694, 2004.

Lipski, et al., Virtual Video Camera: Image-Based Viewpoint Navigation Through Space and Time, Computer Graphics, pp. 1-12, 2010.

Maruno, et al., An Analysis and Implementation of Multigrid Poisson Solvers with Verified Linear Complexity, Image Processing on Line 8 (2018), pp. 192-218, 2018.

Matzen, et al., Low-Cost 360 Stereo Photography and Video Capture, ACM Transactions on Graphics, Article 148, 36(4): 1-13, Jul. 2017.

McMillan, et al., Plenoptic Modeling: An Image-Based Rendering System, Proceedings of SIGGRAPH 95, Los Angeles, California, pp. 1-8, Aug. 1995.

Nover, et al., ESPReSSo: Efficient Slanted PatchMatch for Real-time Spacetime Stereo, Google, pp. 1-9.

Perez, et al., Poisson Image Editing, Microsoft Research UK, CM 0730-0301 03 0700-0313, pp. 313-318, 2003.

Shum, et al., Image-Based Rendering, Springer Science Business Media, LLC, 213 pages, 2007.

Sinha, et al., Piecewise Planar Stereo for Image-based Rendering, Microsoft, pp. 1-8.

Stich, et al., View and Time Interpolation in Image Space, Pacific Graphics, 1-7, 2008.

Szeliski, Computer Vision: Algorithms and Applications, pp. 1-481, Aug. 5, 2010.

Szeliski, et al., Locally Adapted Hierarchical Basis Preconditioning, Microsoft Research, pp. 1-39, May 2006.

Valeniin, et al., Depth from Motion for Smartphone AR, CM Trans. Graph., Article 193, 37(6):1-19, Nov. 2018.

Vangorp, et al., Perception of Perspective Distortions in Image-Based Rendering, ACM Trans Graph, 32(4): 1-35, Jul. 2013.

Vangorp, et al., Perception of Visual Artifacts in Image-Based Rendering of Facades, Computer Graphics Forum, Wiley, Proceedings of the Eurographics Symposium on Rendering, 30(4):1-11, Jul. 8, 2011.

Zitnick, et al., High-quality video view interpolation using a layered representation, ACM 073341301/04.42000.0700, pp. 600-608, 2004.

Zitnick, et al., Stereo for Image-Based Rendering using Image Over-Segmentation, Kluwer Academic Publishers, pp. 1-32, 2006.

International Search Report and Written Opinion for International Application No. PCT/US2020/067020, dated Apr. 19, 2021.

International Search Report and Written Opinion for International Application No. PCT/US2020/067055, dated Apr. 21, 2021.

Chen S.E., "QuickTime VR—An Image-Based Approach to Virtual Environment Navigation," Proceedings of the 22nd annual conference on Computer graphics and interactive techniques, SIGGRAPH, 1995, pp. 29-38.

(56) References Cited

OTHER PUBLICATIONS

Hirschmuller H., et al., "Stereo Processing by Semiglobal Matching and Mutual Information," IEEE Transactions an Pattern Analysis and Machine Intelligence, Feb. 2008, vol. 30 (2), pp. 328-341.

* cited by examiner

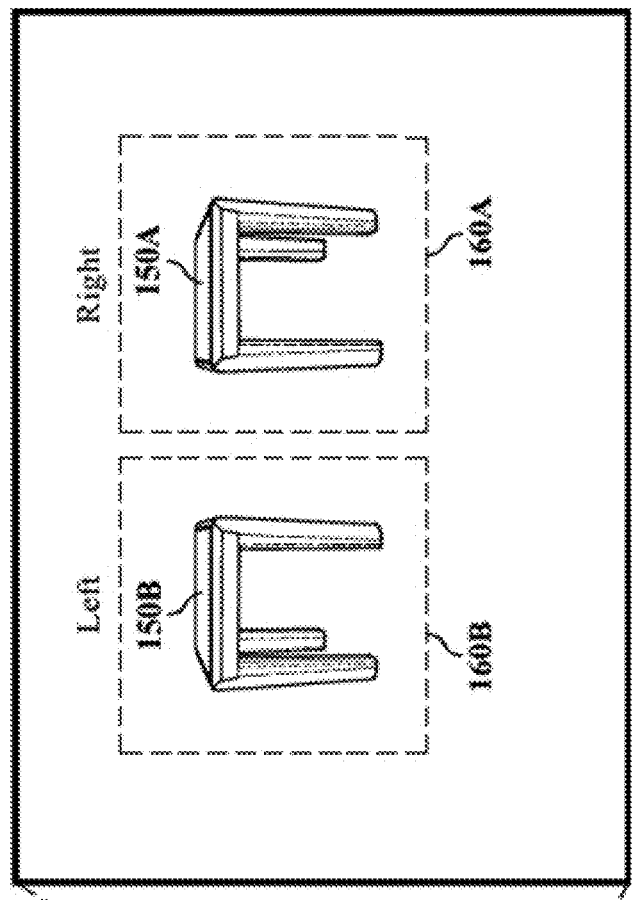
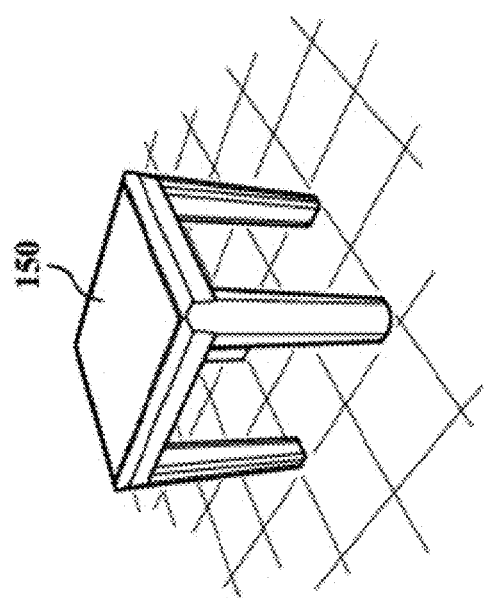
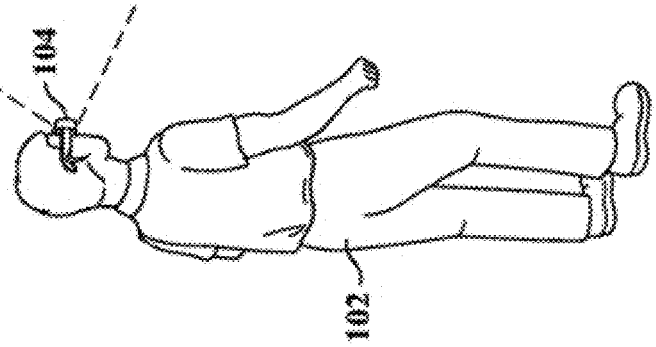
FIG. 1B

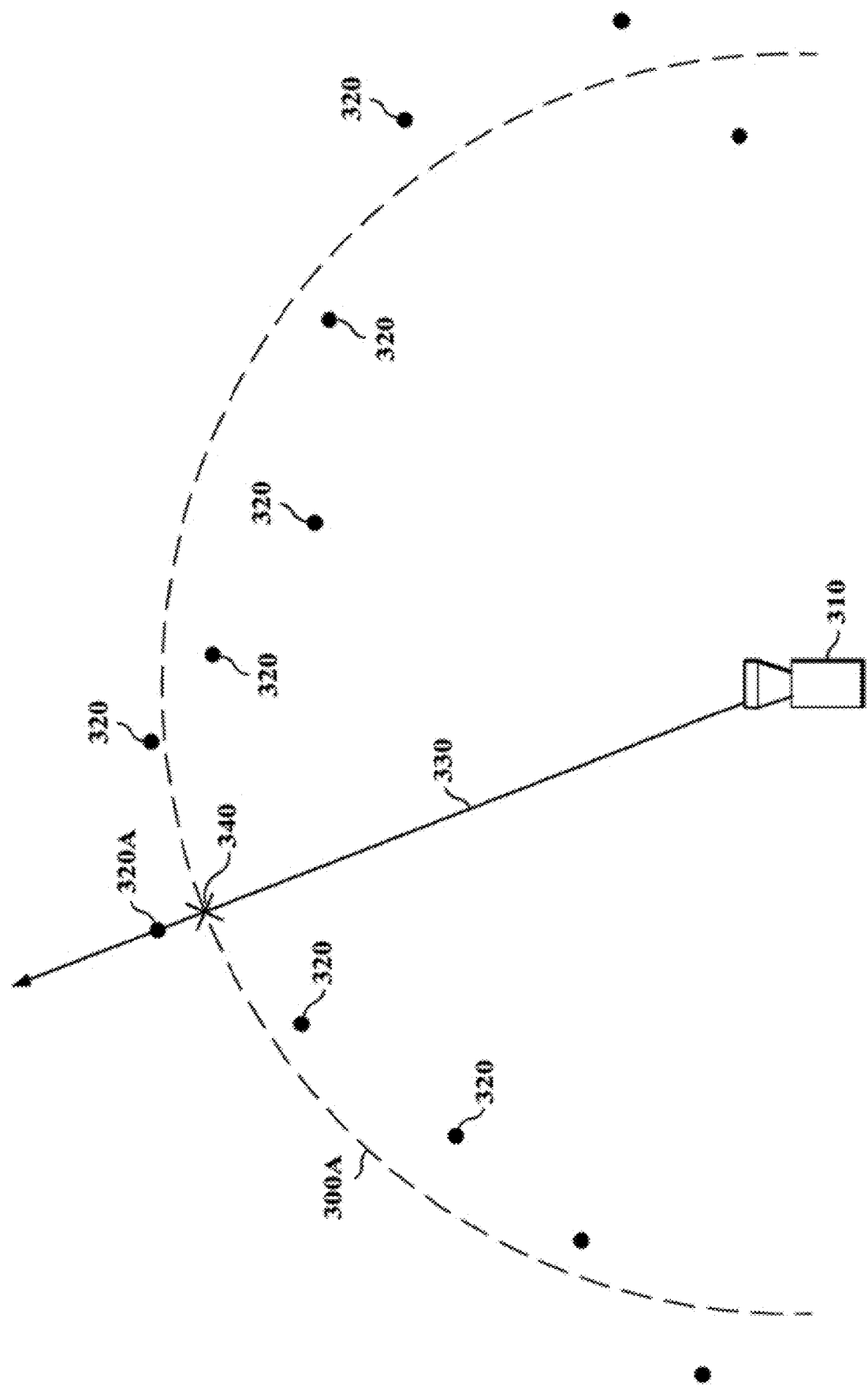

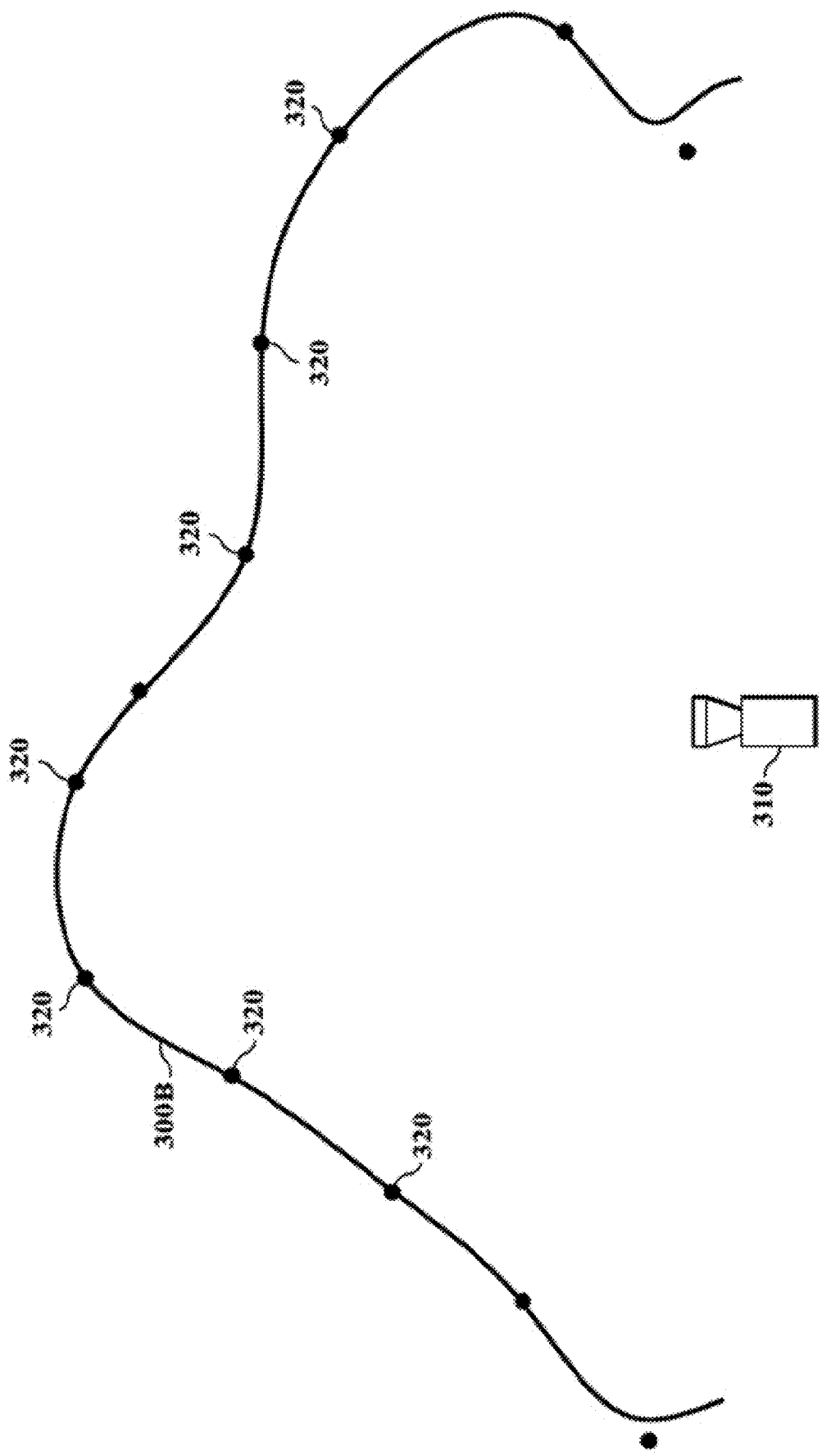

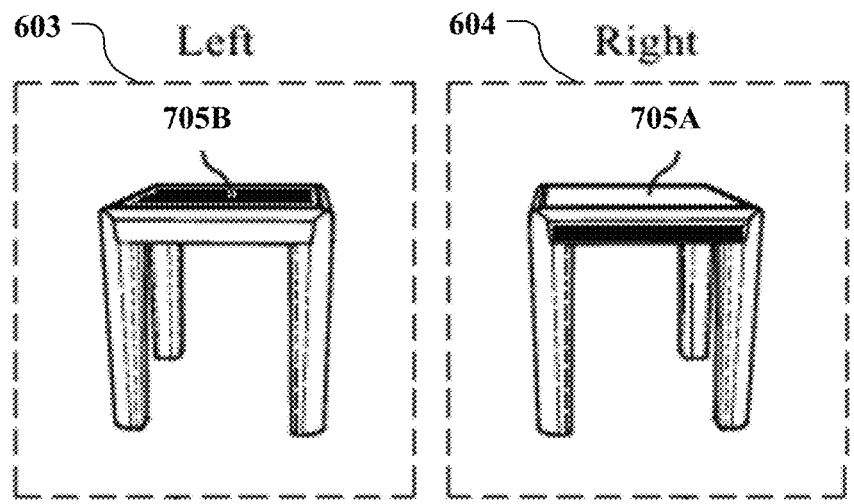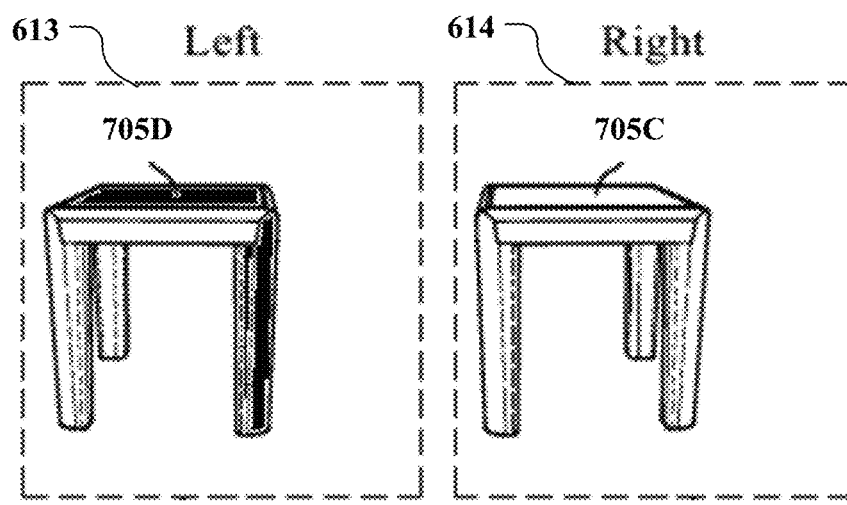
FIG. 7

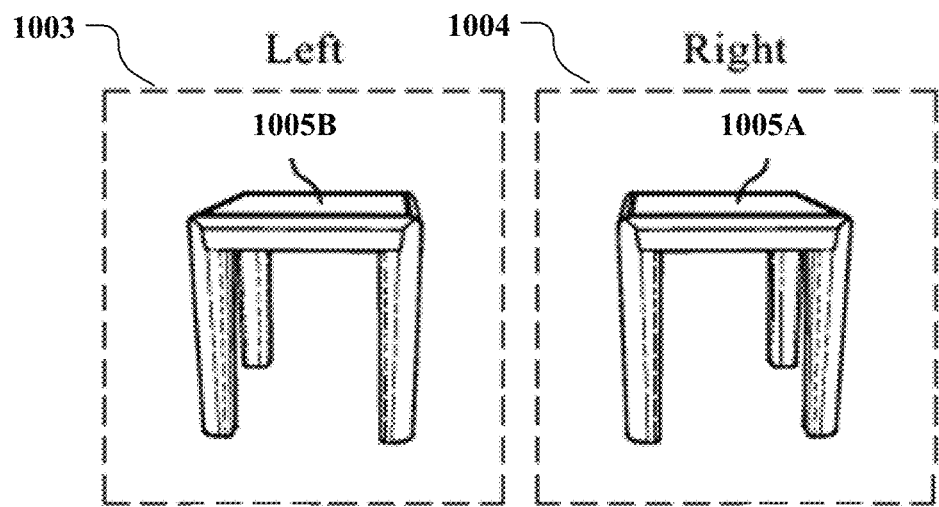
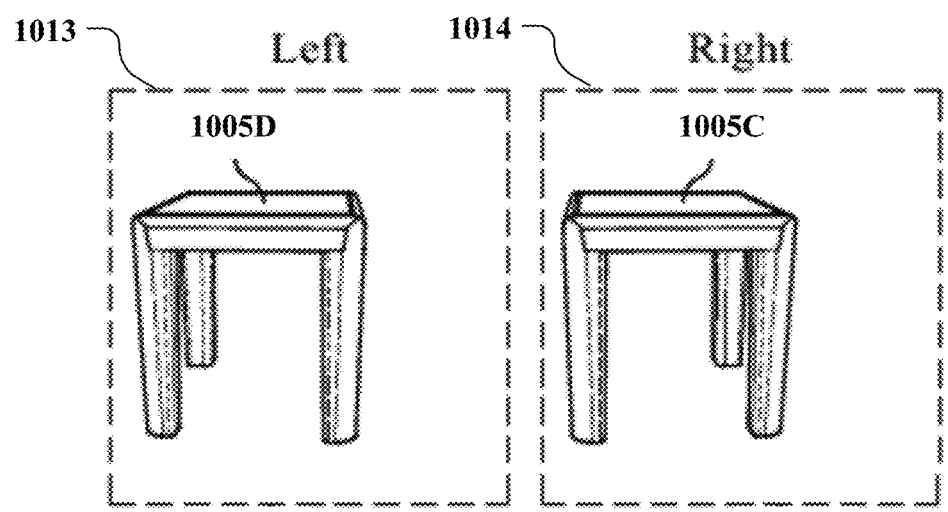
*FIG. 10*

SYSTEMS, METHODS, AND MEDIA FOR COLORIZING GRAYSCALE IMAGES

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

"Passthrough" is a feature that allows a user wearing an HMD to see his physical surroundings by displaying visual information captured by the HMD's front-facing cameras. To account for misalignment between the stereo cameras and the user's eyes and to provide parallax, the passthrough images are re-rendered based on a 3D model representation of the physical surrounding. The 3D model provides the rendering system geometry information, and the images captured by the HMD's cameras are used as texture images. However, the front-facing cameras of the HMD may only be able to capture grayscale images due to the resource limitations of the headset.

Embodiments described herein provide techniques for adding color to grayscale images. A machine-learning ("ML") model may be trained to process a grayscale image and output a colored version of the image. Color generated by the machine-learning model, however, is prone to noise and inconsistencies. Color inconsistencies could be with respect to objects (e.g., the same object in a frame may have different patches of color), time (e.g., the same object appearing in different frames may have different colors), and stereo images (e.g., the same object appears in two images captured by the front-facing cameras may have different colors).

In particular embodiments, post-processing may be applied to the ML-generated color images to improve color consistency. In particular embodiments, post-processing may be based on affinity information between the pixels of the same grayscale image and between the pixels of different grayscale images (e.g., images captured at different times and/or stereo images). In particular embodiments, affinity information may be stored using one or more affinity matrices, which could, for example, identify the pixels in one or more corresponding images that should have the same color. This affinity between pixels could be defined spatially within the same image, across temporal images, and/or between stereo images. In particular embodiments, the affinity may be generated using the grayscale images based on heuristics. For example, for each pair of pixels within the same image, an affinity-determination module may consider their distance, grayscale values, and relevant factors to determine the strength of the affinity. Similarly, affinity values may be assigned for each pair of pixels between a sequence of two frames (e.g., affinity may be computed based on optical flow) and/or between a pair of stereo images (e.g., affinity may be computed by projecting the 3D point associated with a pixel in one image into the other image).

After the ML model generates a color image, each pixel's color may be adjusted according to the affinity matrices. For example, each pixel's color could be defined by a weighted average of other associate pixels specified in the affinity matrices. An optimization algorithm may be used to find the optimal color values that would best satisfy the color definitions for the pixels.

Depending on the number of pixels in the image, the affinity matrices in particular embodiments could be prohibitively large (e.g., 1M pixels would have 1M×1M affinities in the spatial domain alone). Since each pixel would usually only have a strong affinity towards a small percentage of the total pixels, the affinity relationship could instead be represented using eigenvectors. The most influential eigenvectors may then be used in the optimization process for determining color adjustments.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1B illustrates an example of a passthrough feature, in accordance with particular embodiments.

FIGS. 3A and 3B provide top-down illustrations of a 3D mesh being deformed to represent the contours of an observed environment, in accordance with particular embodiments.

FIG. 7 illustrates an example of two pairs of stereo images with inconsistent colorization, in accordance with particular embodiments.

FIG. 10 illustrates an example of color-corrected images, in accordance with particular embodiments.

DESCRIPTION OF EXAMPLE EMBODIMENTS

"Passthrough" is a feature that allows a user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if he were to shift away from where the images were taken. Incorrect parallax, coupled with user motion, could lead to motion sickness. Thus, to generate correct parallax, particular embodiments of the passthrough feature extracts information about the environment from the captured images (e.g., depth information), use the information to generate a 3D model (a geometric scene representation) of the environment, and reconstruct a scene of the modeled environment from the user's current viewpoint.

Photon-to-visuals latency is another issue addressed by the passthrough feature. The delay between a photon hitting the camera and it appearing on the screen (as part of the captured image) determines the visual comfort of interacting in a dynamic world. Particular embodiments of the passthrough feature overcomes this issue by updating the 3D model representation of the environment based on images captured at a sufficiently high rate (e.g., at 30 Hz, 60 Hz, etc.) and rendering images based on the latest known head pose of the user.

Figure 1A:
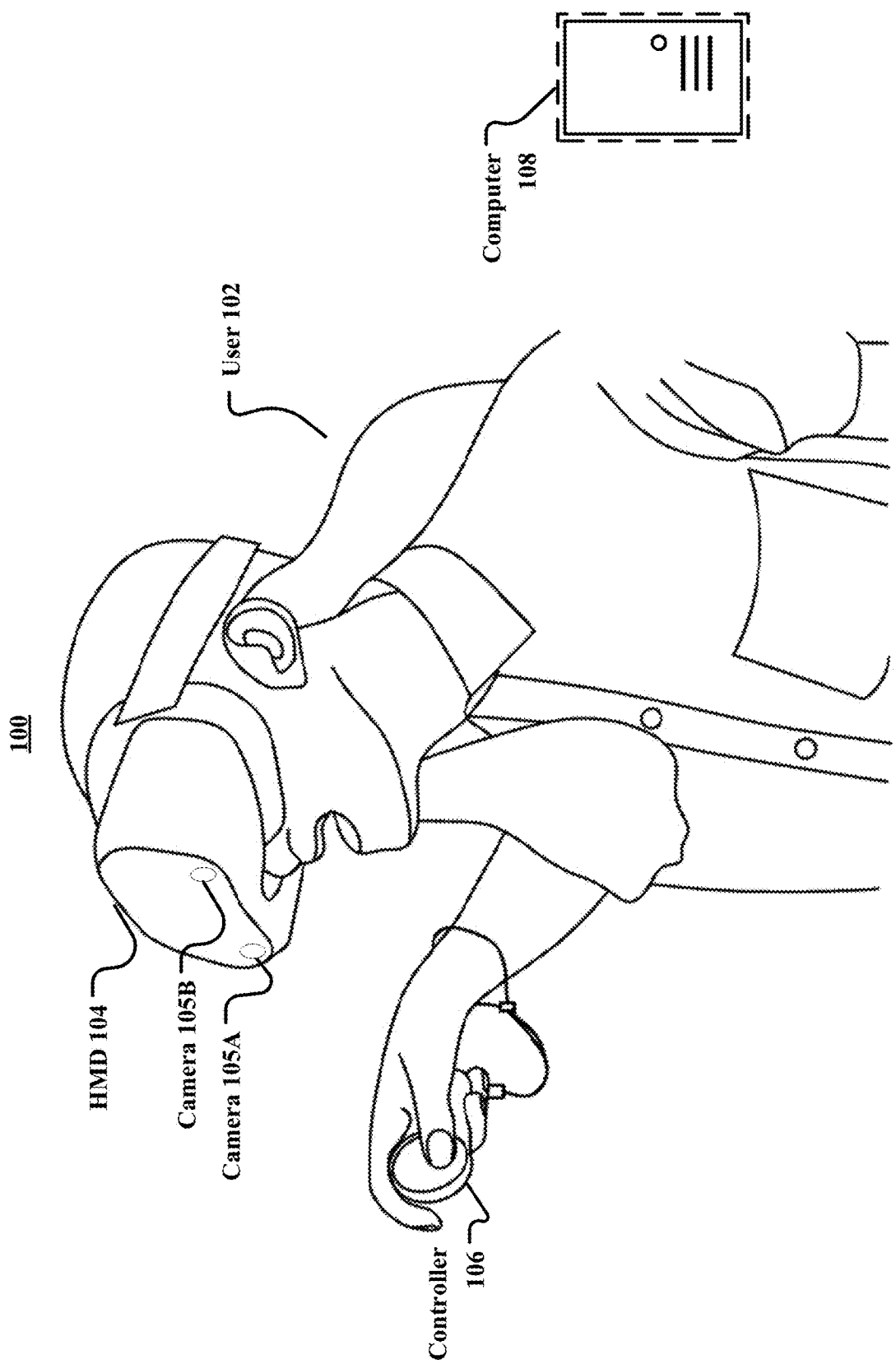
FIG. 1A illustrates an example artificial reality system worn by a user, in accordance with particular embodiments.

FIG. 1A illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to see the table 150 directly. To help the user perceive his physical surroundings while wearing the HMD 104, the passthrough feature captures information about the physical environment using, for example, the aforementioned external-facing cameras 105A-B. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

In embodiments where the computing unit 108 is a high-performance device, an embodiment of the pass-through feature may be designed as follows. Through the external-facing cameras 105A-B of the HMD 104, a sequence of images of the surrounding physical environment may be captured. The information captured by the cameras 105A-B, however, would be misaligned with what the user's eyes would capture since the cameras could not spatially coincide with the user's eyes (e.g., the cameras would be located some distance away from the user's eyes and, consequently, have different viewpoints). As such, simply displaying what the cameras captured to the user would not be an accurate representation of what the user should perceive.

Instead of simply displaying what was captured, the passthrough feature would re-project information captured by the external-facing cameras 105A-B to the user. Each pair of simultaneously captured stereo images may be used to estimate the depths of observed features. As explained above, to measure depth using triangulation, the computing unit 108 would need to find correspondences between the stereo images. For example, the computing unit 108 would determine which two pixels in the pair of stereo images correspond to the same observed feature. A high-performance computing unit 108 may solve the correspondence problem using its GPU and optical flow techniques, which are optimized for such tasks. The correspondence information may then be used to compute depths using triangulation techniques. Based on the computed depths of the observed features, the computing unit 108 could determine where those features are located within a 3D space (since the computing unit 108 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras 105A-B.

The process described above, however, may not be feasible for a resource-limited computing unit (e.g., a mobile phone may be the main computational unit for the HMD). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths, as described above with reference to FIG. 2.

Figure 2:
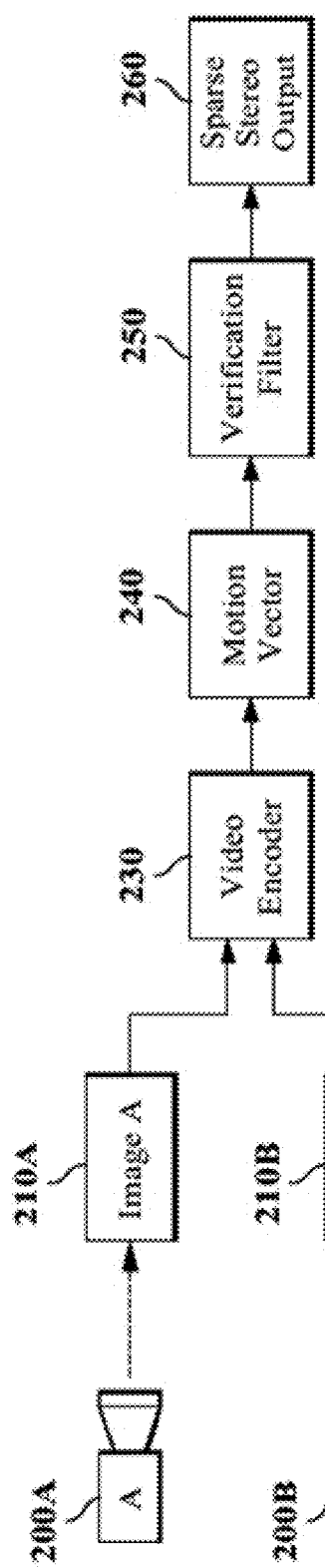
FIG. 2 illustrates an optimized depth estimation technique that leverages a device's video encoder, in accordance with particular embodiments.

FIG. 2 illustrates an optimized depth estimation technique that leverages a device's video encoder 230, in accordance with particular embodiments. A video encoder 230 (hardware or software) is designed to be used for video compression to predict the motion of pixels in successive video frames to avoid storing repetitions of the same pixel. It is common on any computing device capable of capturing and displaying video, even resource-limited ones like mobile phones. The video encoder 230 achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images may be computed using a device's video encoder. FIG. 2 shows two stereo cameras 200A and 200B that simultaneously capture a pair of stereo images 210A and 210B, respectively. Using an API provided for the device's video encoder, the passthrough feature may instruct the video encoder 230 to process the two stereo images 210A and 210B. However, since video encoders 230 are designed to find correspondence between sequential frames captured at a high frame rate (e.g., 30, 60, 80, or 100 frames-per-second), which means that sequential frames are likely very similar, having the video encoder 230 find correspondences between two simultaneously captured stereo images 210A-210B may yield suboptimal results. Thus, in particular embodiments, one or both of the images 210A-210B may undergo a translation based on the known physical separation between the two cameras 200A and 200B so that the images 210A and 210B would be more similar.

The output of the video encoder 230 may be a motion vector 240 that describes the predicted correspondences between images 210A and 210B using per-pixel offsets. The motion vector 240, however, could be noisy (i.e., many of the correspondences could be inaccurate). Thus, in particular embodiments, the motion vector 240 may undergo one or more verification filters 250 to identify the more reliable correspondence predictions. For example, one verification filter 250 may use the known geometry of the cameras 200A and 200B to determine epipolar lines for each pixel. Using the epipolar line associated with each pixel, the computing device could determine whether the corresponding pixel as identified by the motion vector 240 is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter 250 may assess the reliability of a correspondence found by the motion vector 240 based on temporal observations. This temporal filtering process may be applied to the original motion vector 240 or only to a subset of the motion vector 240 that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passes through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points.

After the verification filtering process 250, the system would have a collection of stereo outputs or depth measurements 260. The collection 260 may be very sparse (or low resolution). For example, if each image has a resolution of 640×480 pixels, that means a high-accuracy correspondence could yield upwards of 307,200 depth measurements or points. Due to the noise and inaccuracy of the motion vector 240, the number of reliable points after the verification filtering process 250 may be in the range of, e.g., 1000-3000 points. Having a non-uniform density of the collection of depth measurements means that geometry information is lacking in certain regions. As such, particular embodiments may perform a densification process to fill in the missing depth information.

Once the computing device has generated a point cloud (whether dense or sparse) based on the depth measurements, it may generate a 3D mesh representation of a contour of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. The 3D mesh, which may be represented as a depth map, may therefore have incomplete information (e.g., certain grids on the mesh may not have a corresponding verified depth measurement). In particular embodiments, a single 3D mesh may be used to approximate all the objects observed. Conceptually, the 3D mesh is analogous to a blanket or sheet that covers the entire observable surfaces in the environment.

FIGS. 3A and 3B provide top-down illustrations of a 3D mesh being deformed to represent the contours of an observed environment. For clarity, the figures are drawn in 2D, but it should be understood that the 3D mesh is a 3D construct. FIG. 3A illustrates an embodiment of the 3D mesh 300A being initialized to be equal-distance (e.g., 1, 2, 2.5, or 3 meters) from a viewer 310 (represented by a camera). In the particular example shown, the radius of the 3D mesh 300A is 2 meters. Since the 3D mesh 300A is equal-distance away from the viewer 310, it forms a hemisphere around the user. For clarity, FIG. 3A illustrates a portion of a cross-section of that hemisphere, resulting in the half-circle shown. FIG. 3A further illustrates points (e.g., 320) in the point cloud that are deemed reliable. These points 320 represent observed features in the environment and may be generated using the embodiments described elsewhere herein.

The 3D mesh 300A may be deformed according to the points 320 in order to model the contour of the environment. In particular embodiments, the 3D mesh 300A may be deformed based on the viewer's 310 position and the points 320 in the point cloud. To determine which portion of the 3D mesh 300A corresponds to each point in the point cloud 320, the computing device may cast a conceptual ray from the viewer's 310 position towards that point. Each ray would intersect with a primitive (e.g., a triangle or other polygon) of the 3D mesh. For example, FIG. 3A shows a ray 330 being cast from the viewer 310 towards point 320A. The ray 330 intersects the 3D mesh 300A at a particular location 340. As a result, mesh location 340 is deformed based on the depth value associated with the point 320A. For example, if the point 320 is 2.2 meters away from the viewer 310, the depth value associated with the mesh location 340 may be updated to become 2.2 meters from its initial value of 2 meters. FIG. 3B illustrates the deformed 3D mesh 300B that may result from the deformation process. At this point, the deformed mesh 300B represents the contour of the physical environment observed by the viewer 310.

Figure 4:
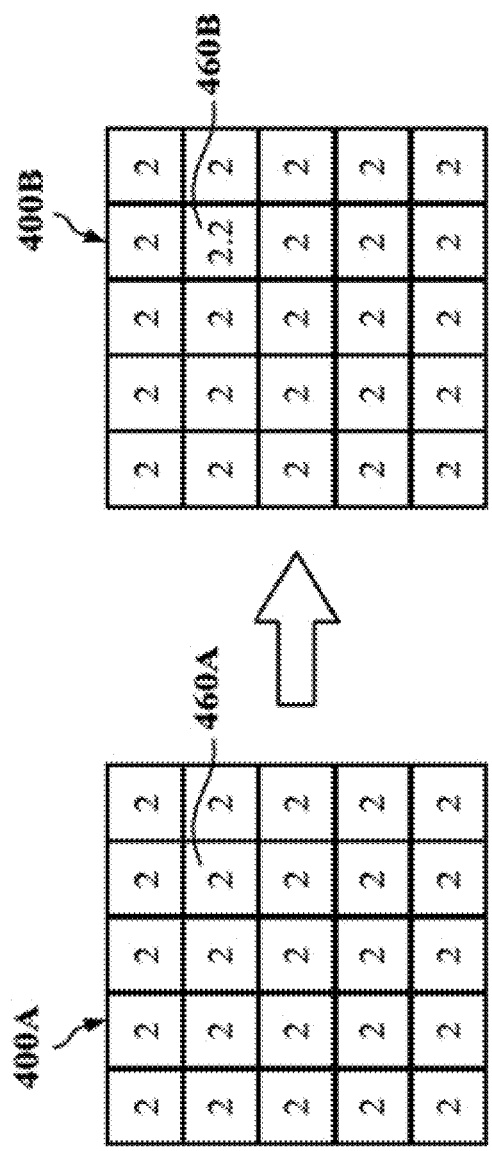
FIG. 4 illustrates an example of a data structure that may be used to represent the 3D mesh, in accordance with particular embodiments.

FIG. 4 illustrates an example of a data structure (e.g., a depth map) that may be used to represent the 3D mesh. In particular embodiments, the depth values that define the shape of the 3D mesh (e.g., mesh 300A shown in FIG. 3A) may be stored within a matrix 400A. The vertices of the primitives that form the mesh 300A may each have a corresponding cell in the matrix 400A, where the depth value of that vertex is stored. In particular embodiments, the coordinates of each cell within the matrix 400A may correspond to the radial coordinates of the vertex in the mesh, as measured relative to the viewer 310. Initially, the depth stored in each cell of the matrix 400A may be initialized to the same distance (e.g., 2 meters), which would result in the hemispheric mesh 300A shown in FIG. 3A. Based on the ray casting process described above, the depth values stored in the matrix 400A may be updated. For example, referring again to FIG. 3A, the ray 330 that was cast towards point 320A may intersect the mesh at location 340. The computing device may determine that the location 340 on the mesh 300A corresponds to cell 460A in the matrix 400A. The current depth stored in cell 460A may be updated to reflect the depth value of point 320A, which is 2.2 meters in the particular example given. As a result, the updated matrix 400B stores 2.2 as the depth value in the updated cell 460B. As previously mentioned, the number of verified depth measurements in the point cloud may be sparse, which in turn would lead to the mesh having incomplete information (e.g., a cell may not get updated). Thus, in particular embodiments, after the entire matrix has been updated based on the available points in the point cloud, the updated matrix may be processed using a Poisson smoothing technique (e.g., Poisson Solver) or any other suitable technique to, in effect, smooth the contours of the splines of the 3D mesh and filling missing depth values in the matrix. The Poisson smoothing technique is, therefore, being tasked to solve the problem of having incomplete depth data in the matrix representing the 3D mesh. The result is a 3D mesh contour that represents the depth of the observed world.

The mesh generated above may be computed from sparse 3D points (e.g., computed using motion vector stereo data). Changes in camera sensor noisek lighting conditions, scene content, etc., may cause fluctuations in the sprase 3D point set. These fluctuations make their way into the mesh and may cause intermittent warping, bending, bubbling and wiggling of the resulting video frames rendered using the mesh. As previously described at least with reference to FIG. 2, the temporal smoothness problem may be alleviated by applying a temporal filter on the point cloud generated using, e.g., motion vectors. In particular embodiments described above, the point cloud resulting from the filtering process may then be projected onto a hemisphere to generate a 3D mesh, and a Poisson smoothing technique or any other suitable smoothing technique may be applied to fill in missing depth information and improve the smoothness of the mesh.

To further improve temporal smoothness, particular embodiments may generate the 3D mesh (or its corresponding depth map data structure) using not only the sparse point cloud (e.g., the vetted points that survived the filtering process) generated from the current image capture but also additional points from completed 3D mesh generated in previous time instances. For example, at a current time t, a 3D mesh may be generated based on (1) the sparse point cloud generated using images observed at time t and (2) the 3D mesh generated for time t−1. Since the 3D depth information at time t−1 is relative to the user's viewpoint at time t−1, that 3D depth information would need to be projected to the current user's viewpoint at time t. The projected depth information may then supplement the point cloud generated at time t. The supplemented data set of depth information may then be used to generate a 3D mesh (e.g., by projecting the points in the supplemented data set onto a hemisphere). The generated 3D mesh may in turn be processed using a Poisson smoothing technique or any other suitable smoothing technique to fill in missing depth information and improve the smoothness of the mesh.

Figure 5:
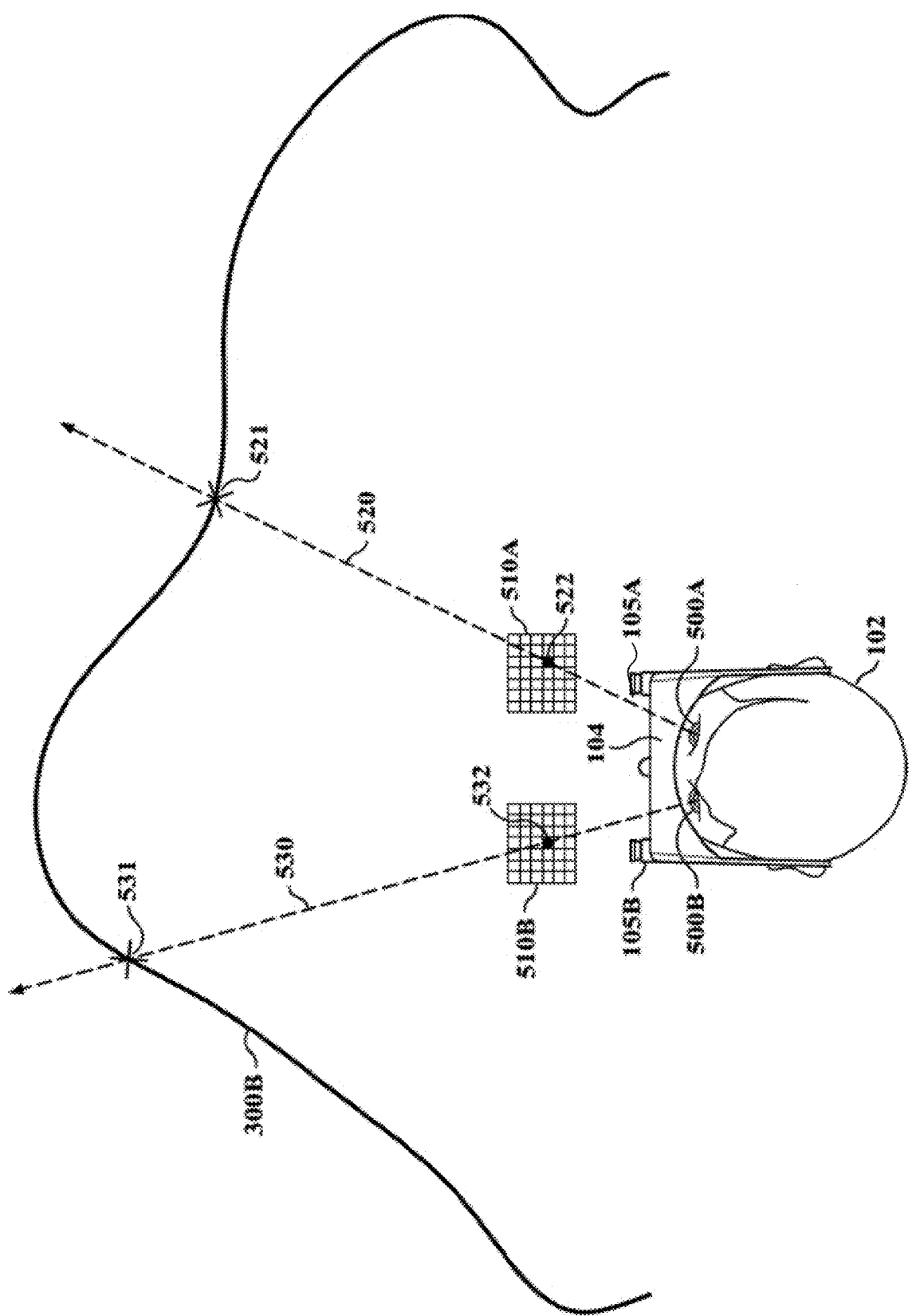
FIG. 5 provides an illustration of 3D-passthrough rendering based on the 3D mesh, in accordance with particular embodiments.

FIG. 5 provides an illustration of 3D-passthrough rendering based on the 3D mesh. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 500A and 500B using offsets from the pose of the HMD 104. The system may then render a passthrough image for each of the user's eyes 500A-B. For example, to render a passthrough image for the user's right eye 500A, the system may cast a ray 520 from the estimated viewpoint of the right eye 500A through each pixel of a virtual screen space 510A to see which portion of the mesh 300B the rays would intersect. This ray casting process may be referred to as a visibility test, as the objective is to determine what is visible from the selected viewpoint 500A. In the particular example shown, the ray 520 projected through a particular pixel 522 intersects with a particular point 521 on the mesh. This indicates that the point of intersection 521 is to be displayed by the pixel 522. Once the point of intersection 521 is found, the rendering system may sample a corresponding point in a texture image that is mapped to the point of intersection 521. In particular embodiments, the image captured by the cameras 105A-B of the HMD 104 may be used to generate a texture for the mesh 300B. Doing so allows the rendered image to appear more like the actual physical object. In a similar manner, the rendering system may render a passthrough image for the user's left eye 500B. In the example shown, a ray 530 may be cast from the left-eye viewpoint 500B through pixel 532 of the left screen space 510B. The ray 530 intersects the mesh 300B at location 531. The rendering system may then sample a texture image at a texture location corresponding to the location 531 on the mesh 300B and compute the appropriate color to be displayed by pixel 532. Since the passthrough images are re-rendered from the user's viewpoints 500A-B, the images would appear natural and provide proper parallax effect.

Figure 6:
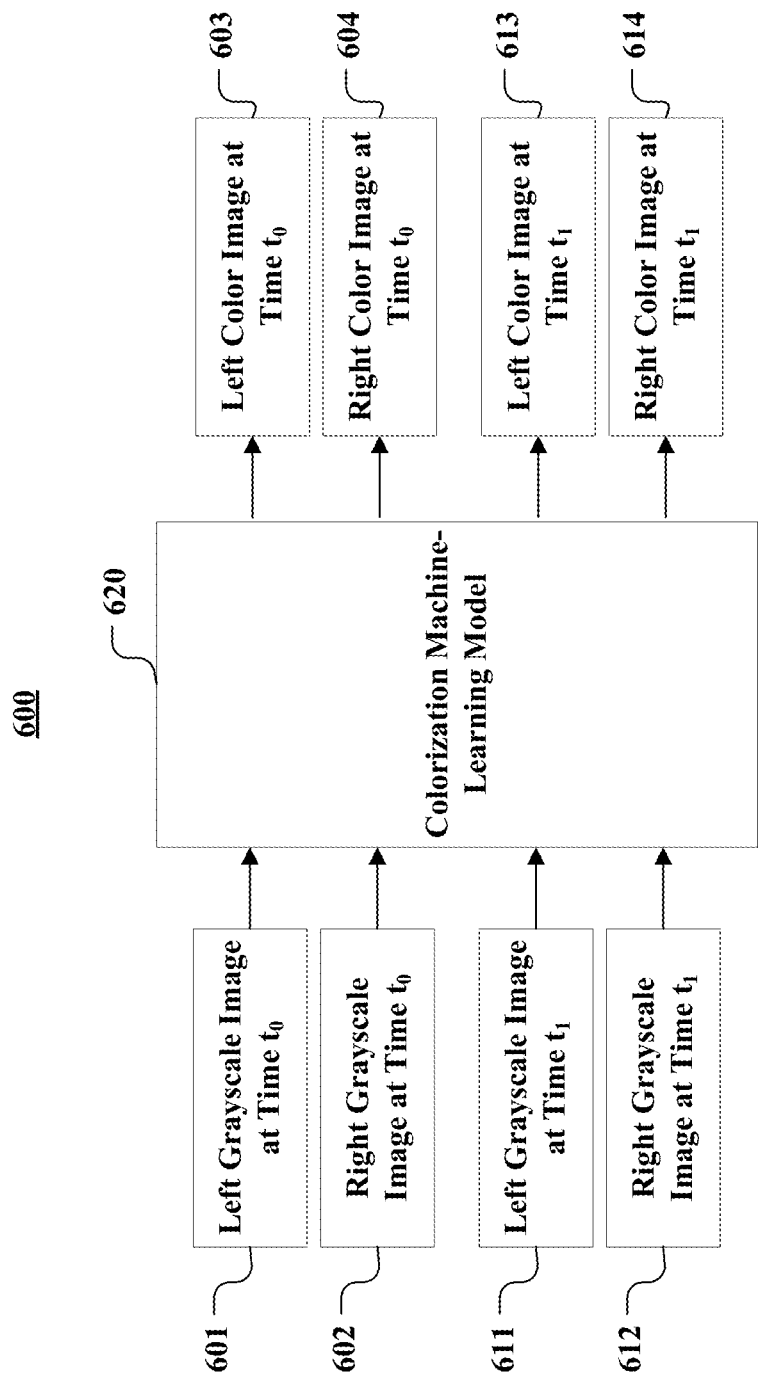
FIG. 6 illustrates a block diagram for colorizing grayscale images, in accordance with particular embodiments.

In particular embodiments, images captured by the HMD, which may be used as texture images for rendering passthrough visualization, may be in grayscale. Consequently, the passthrough visualization would also be in grayscale. To provide color, particular embodiments may use a machine-learning model to colorize the grayscale images. FIG. 6 illustrates a block diagram 600 for colorizing grayscale images. The block diagram 600 illustrates two pairs of stereo images captured at different times, time to and time $t_1$ (e.g., the stereo images may be video frames). Specifically, block diagram 600 shows a stereo pair of left 601 and right 602 grayscale images captured at time to and another stereo pair of left 611 and right 612 grayscale images captured at time $t_1$. The images 601, 602, 611, 612 may be processed by a colorization machine-learning model 620 to generate corresponding colorized images 603, 604, 613, 614, respectively. The colorization machine-learning model 620 may be trained to transform grayscale images into color images. For example, the colorization model 620 (e.g., a neural network, such as a convolutional neural network) may be trained on a set of training samples that each has a grayscale image and a corresponding colored version of the same image (the ground truth). During a training iteration, the colorization ML model 620 may process the grayscale image of a training sample and generate an output color image. The output color image may then be compared to the ground-truth color image of the training sample using a loss function. The loss function may quantify the error between the output color image and the ground-truth color image. The quantified error may then be used to update the parameters of the colorization ML model 620 (e.g., via backpropagation) so that it would perform better in the next iteration.

One problem with the above approach is that the colorization provided by the machine-learning model 620 may be unpredictable, especially if the model 620 is trained to colorize each image independently. FIG. 7 illustrates an example of two pairs of stereo images with inconsistent colorization, generated using the process described above with reference to FIG. 6. As shown in FIG. 1B, the table should be all white. However, in the example shown in FIG. 7, the machine-learning model 620 colored the table 705B inconsistently within image 603. Specifically, the top portion of the table 705B in image 603 is black, but the rest of the table 705B is white. The colorization of the stereo pair of images 603 and 604 is also inconsistent. In image 603, the top of the table 705B is black, but the side of the table 705B is white. In contrast, in image 604, the top of the table 705A is white, and the side of the table 705A is black. Furthermore, the colorization generated by the machine-learning model 620 is inconsistent temporally. For example, the table 705B in the left image 603 captured at time to is colored differently than the table 705D in the left image 613 captured at time $t_1$. Specifically, one of the legs of the table 705D is colored black in image 613, whereas all the legs of the table 705B are white in image 603. Similarly, it can be seen that the color of the table 705A in the right image 604 captured at time to is different from the color of the table 705C in the right image 614 captured at time $t_1$.

The color inconsistencies shown in FIG. 7 could cause a variety of undesirable visual artifacts. In a single image, having multiple patches of color for the same object is unnatural and distractive. In addition, color inconsistencies between stereo images would be difficult for a user's visual system to process, as the color of an object observed by one eye is different from the color observed by the other eye. Furthermore, temporal color inconsistencies would cause flicker.

Figure 8:
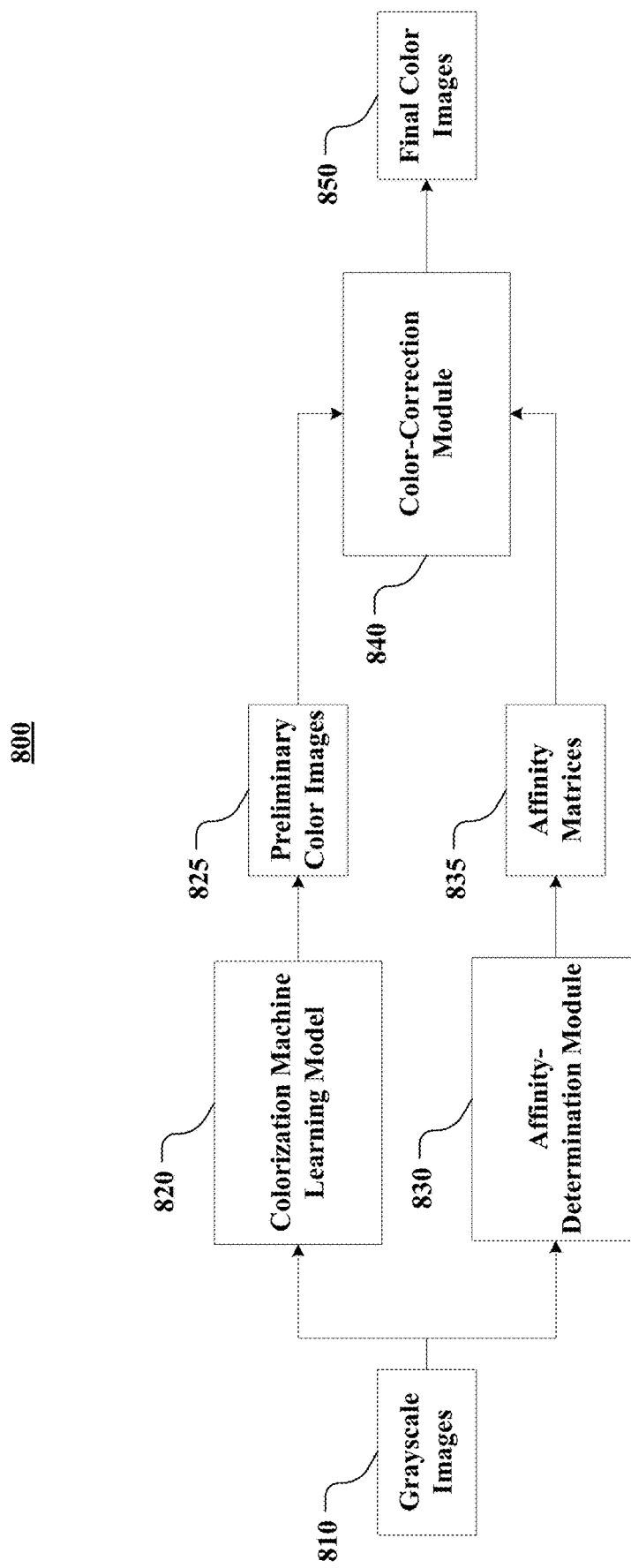
FIG. 8 illustrates a technique for correcting color inconsistencies, in accordance with particular embodiments.

FIG. 8 illustrates a technique for correcting color inconsistencies, in accordance with particular embodiments. The correction may be performed spatially within each image, temporally between image sequences, and/or between pairs of stereo images. Grayscale images 810, such as the ones captured by the HMD, may be the input. The grayscale images 810 may be a single image, a sequence of images (e.g., frames in a video), a pair of stereo images (or any number of simultaneously captured images with an overlapping field of view), and/or a sequence of stereo images.

In particular embodiments, the grayscale images 810 may be processed by a colorization machine-learning model 820, such as the one described above with reference to FIG. 6. The model 820 may output preliminary color images 825, which are colored versions of the grayscale images 810. The preliminary color images 825 may have color inconsistencies. As shown in FIG. 7, the color inconsistencies may be spatial, temporal, and/or stereoscopic.

In particular embodiments, an affinity-determination module 830 may process the grayscale images 810 to generate affinity matrices 835. The affinity-determination module 830 may determine the affinities between the pixels of the input grayscale images 810. Depending on the relationship between the input images 810, the affinity-determination module 830 may select the appropriate algorithm to determine affinities. For example, the affinity-determination module 830 may use one or more algorithms to identify affinities within each image, one or more algorithms to identify affinities between stereo images, and one or more algorithms to identify affinities between temporally-related images. Embodiments of the algorithms will be described in further detail below. The resulting affinity matrices 835 may identify one or more pixel collections, with each pixel collection identifying pixels across different images 810 that should have consistent color, regardless of whether the images are related spatially, temporally, and/or stereoscopically.

In particular embodiments, a color-correction module 840 may use the affinity matrices 835 to correct the color of the preliminary images 825. For example, the color-correction module 840 may use the affinity matrices 835 to define relational color dependencies between pixels. For instance, for a given pixel, the color-correction module 840 may define its color as the linear weighted average of the colors of other pixels, with the weights being specified by the affinity matrices 835. After similarly defining the colors of all pixels in the preliminary color images 825, the color-correction module 840 may solve the linear equations as an optimization problem. For example, the color-correction module 840 may use conjugated gradient, gradient descent, or any other suitable optimization algorithms. The result of the solved optimization problem is a set of final color images 850, which correspond to color-corrected versions of the preliminary color images 825.

As described above, the affinity information may be used to formulate an optimization problem, which may be solved using any suitable optimization algorithm. However, since the affinity information may be large in certain scenarios, the optimization problem may become impractically large, especially for real-time applications (e.g., passthrough visuals may need to be generated at a fraction of a second to provide the user with real-time information). For example, if an image has 1M pixels (one million), the size of an affinity matrix for just the affinities within the image may be 1M×1M. If additional affinity matrices are needed to encode pixel relationships between stereo images and temporally-related images, then the size of the affinity matrices would be orders of magnitude larger. For example, to encode the affinity with another temporally-related image and a stereo image, the affinity matrices would be 3×1M×1M.

In particular embodiments, the size of the optimization problem may be reduced by using eigenvectors to represent the affinity matrices. Typically, each pixel would only have an affinity to a small proportion of the other candidate pixels. For example, out of 1M pixels, a pixel may only have an affinity to 1000 other pixels. Since affinity matrices are typically sparse (mostly 0's), eigendecomposition may be used to decompose the affinity matrices into eigenvectors and eigenvalues. The eigen representation allows the affinity information to be represented in a significantly lower dimension, which in turn reduces the size of the optimization problem that would need to be solved.

Figure 9:
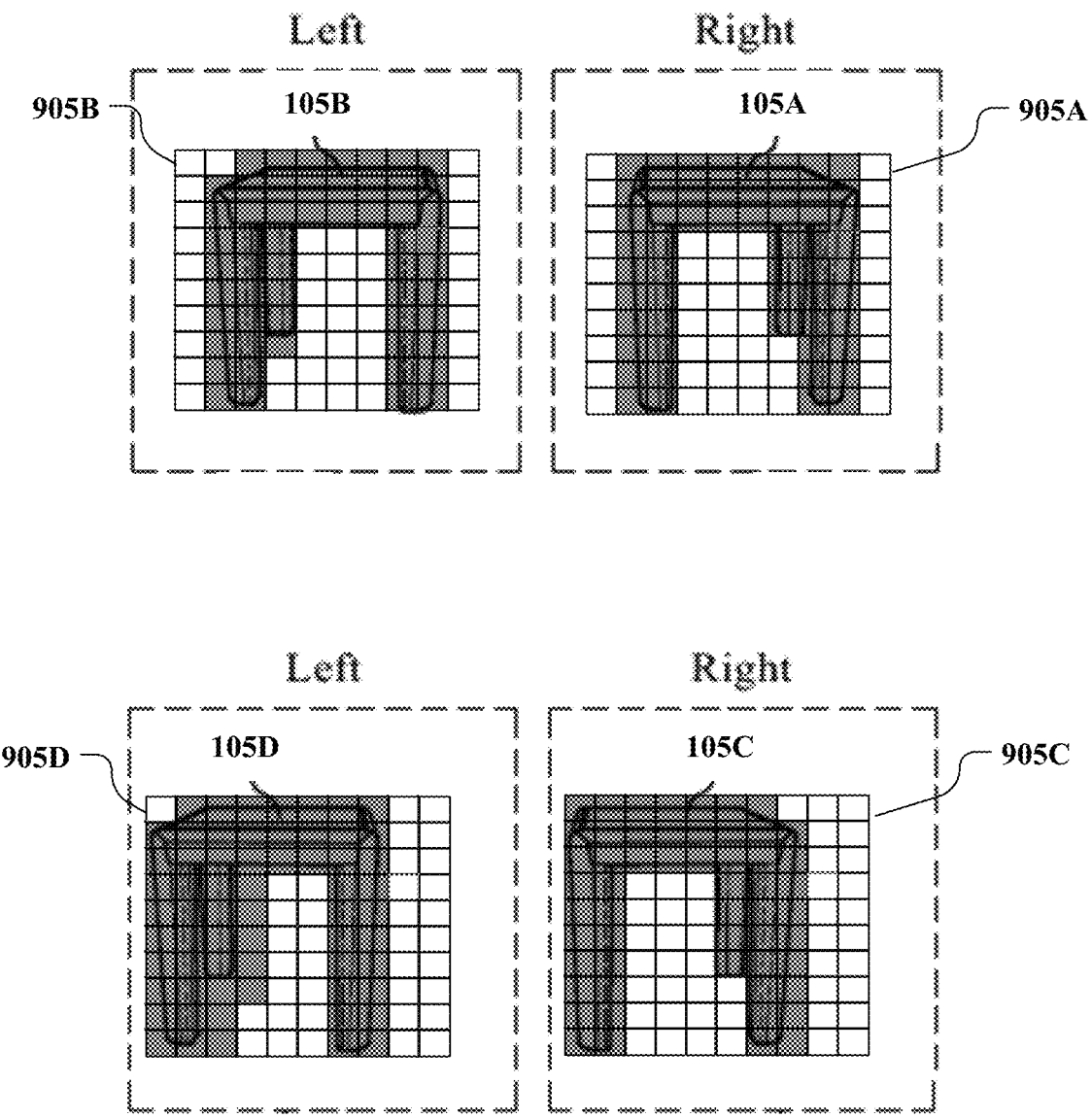
FIG. 9 provides an example of a visual representation of affinity information between images, in accordance with particular embodiments.

FIG. 9 provides an example of a visual representation of affinity information between images, in accordance with particular embodiments. The affinity information may indicate relationships, or affinities, between the images' pixels. Affinity information may be encoded in a variety of ways. For example, an affinity matrix that corresponds to the pixels of an image may store each pixel's affinity towards a particular pixel. For example, if a pixel at ($x_1$, $y_1$) is likely related to another pixel at ($x_2$, $y_2$) but unlikely related to ($x_3$, $y_3$), the affinity matrix may encode a larger affinity value in the ($x_2$, $y_2$) location in the matrix and a smaller affinity value in the ($x_3$, $y_3$) location in the matrix. For example, if the affinity-value range is from 0 to 1, the larger affinity value may be 0.8 and the smaller affinity value may be 0. Such an affinity matrix may encode the relationship between pixels within the same image, between stereo images, and/or between temporally-related images. The affinity matrix is being provided as one example of how affinity information may be encoded. This disclosure contemplates any other suitable representations of affinity information, including, for example, conditional random field or any other suitable techniques for encoding relationships between pixels.

The visual representations of affinity information presented in FIG. 9 show examples of pixel relationships within the same image, between stereo images, and between temporally-related images. The tables 105A and 105B are depicted in a pair of stereo grayscale images captured at time to, and tables 105C and 105D are depicted in another pair of stereo grayscale images captured at time $t_1$. The affinity information for table 105B is visually represented by matrix 905B. The darkened cells of the matrix 905B represent pixels that are likely related. As shown, the darkened cells of matrix 905B correspond to where table 105B appears. In a similar manner, the darkened cells of matrix 905A correspond to where table 105A appears, the darkened cells of matrix 905C correspond to where table 105C appears, and the darkened cells of matrix 905D correspond to where table 105D appears.

Spatial affinity between pixels of the same image may be determined based on a variety of algorithms or heuristics. For example, in the image where table 105B appears, pixels may be compared to one another based on their grayscale values and relative distance. For instance, there is a higher likelihood of two pixels being related if they have similar grayscale values (e.g., the grayscale values may be deemed to be similar if they are within a predetermined threshold difference) and are close to each other. However, if their grayscale values are similar but they are not close to each other, the likelihood of them being related would be less. Similarly, if they are close to each other but their grayscale values are dissimilar, the likelihood of them being related would also be less. For pixels that are far apart with respect to distance and grayscale value, they may be deemed unlikely to be related to each other. In particular embodiments, the algorithm or heuristic used for determining pixel relationships may further consider other factors, such as whether the pixels are connected by other pixels with similar grayscale values, whether an object segmentation mask (e.g., generated by a machine-learning model trained to identify objects in an image) indicates that the pixels belong to the same object instance or the same object classification, etc.

Affinity information may also include pixel relationships between stereo images. For example, the darkened cells of matrix 905B are related to the darkened cells of matrix 905A because they all depict the same table (table 105B and table 105A depict the same physical table from different viewpoints). The algorithm or heuristic used for finding pixel relationships between stereo images may extend the principals describe above. For example, the algorithm or heuristic may factor in similarity in grayscale values. Object-detection data (e.g., object segmentation masks), if available, may also be used to determine which portions of the stereo images should be related. Additionally, the algorithm or heuristic may consider the proximity between the relative positions of the two pixels in their respective images. However, since the pair of stereo images are captured from different viewpoints, adjustments may need to be made to account for that viewpoint difference. For example, instead of comparing a pixel at the (x, y) location in the left image to the pixel at the same (x, y) location in the right image, the algorithm or heuristic may use 3D information generated from the pair of stereo images to identify pixels that are likely related. For example, based on localization techniques such as SLAM (simultaneous localization and mapping), the computing system of the user's HMD may know the poses of the stereo cameras of the HMD at the time when the stereo images were captured. The computing system may use the poses of the two stereo cameras to position two corresponding virtual cameras in a 3D space where a 3D representation of the physical objects in the environment is defined. Based on the poses of the two virtual cameras, the computing system could re-project a particular point on the 3D representation to the screen spaces of the two virtual cameras. The pixel locations to which the point is re-projected may have a higher likelihood of being related. Additionally or alternatively, the computing system may use techniques for finding correspondences between stereo images to identify pixels that are likely related. For example, optical flow or motion vectors, as described in further detail above, may be used to find correspondences between stereo images.

Affinity information may also include pixel relationships between temporally-related images (e.g., two or more images), such as frames in a video. For example, FIG. 9 shows that the darkened cells of matrix 905D are likely related to the darkened cells of matrix 905B, and the darkened cells of matrix 905C are likely related to the darkened cells of matrix 905A. The spatial relationship between the pixels in sequential frames may be estimated using techniques such as optical flow or motion vectors. Additionally or alternatively, pixels that are likely related across temporally-related images may be compared based on their grayscale values, relative spatial distance, object-detection data (e.g., segmentation or classification) and/or temporal distance (e.g., the likelihood of two pixels being related is higher if they are temporally closer together and lower if they are temporally farther apart, as indicated by the times at which the temporally-related images were captured).

FIG. 10 illustrates an example of color-corrected images, in accordance with particular embodiments. As discussed above and shown in FIG. 7, the color images generated by a colorization machine-learning model may suffer from color inconsistencies. After being corrected by a color-correction module, the color of related pixels identified by the affinity information would be modified to be more consistent within individual images, between stereo images, and/or between temporally-related images. FIG. 10, for example, shows a set of color-corrected images, including a pair of color-corrected stereo images 1003 and 1004 associated with time to and another pair of color-corrected stereo images 1013 and 1014 associated with time $t_1$. Unlike the tables shown in FIG. 7, the tables 1005A, 1005B, 1005C, 1005D depicted in images 1004, 1003, 1014, 1013 have a substantially uniform color.

Figure 11:
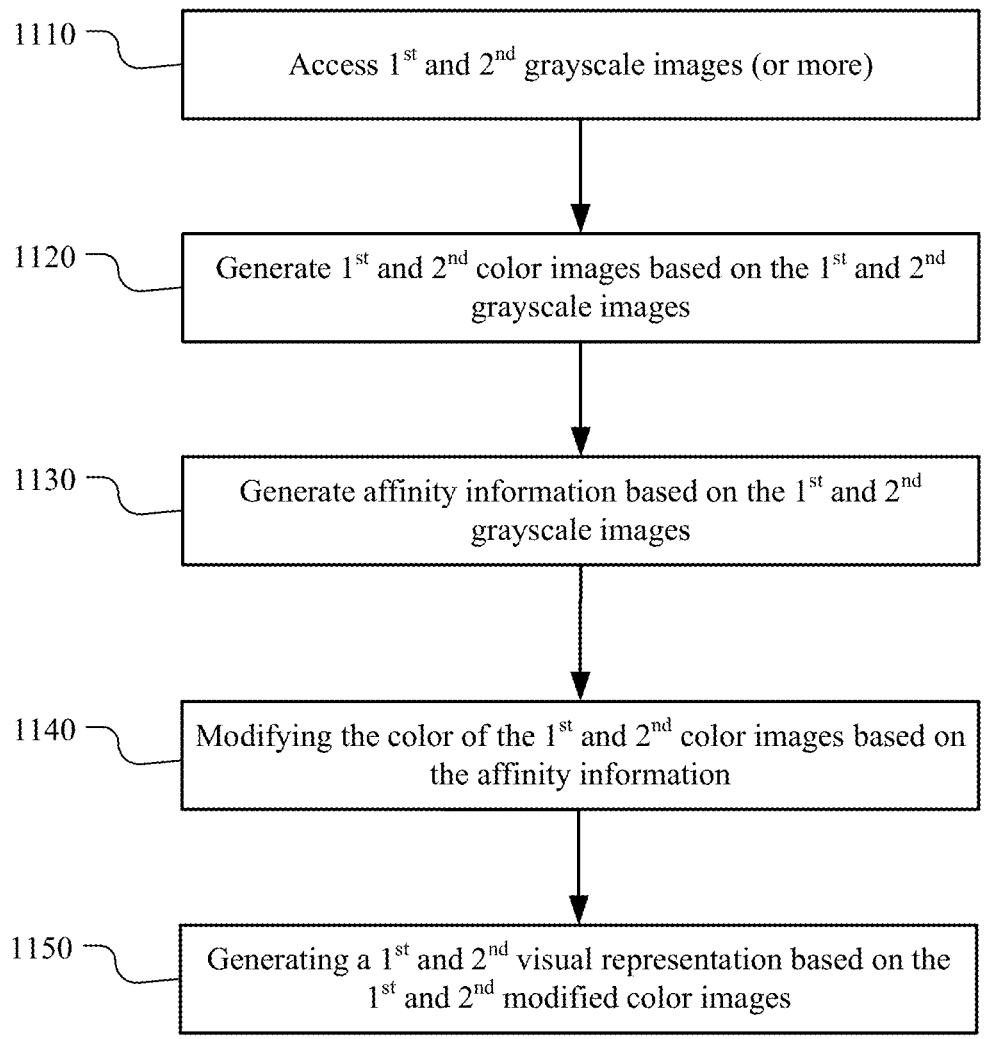
FIG. 11 illustrates an example method for colorizing grayscale images, in accordance with particular embodiments.

FIG. 11 illustrates an example method 1100 for colorizing grayscale images. The method may begin at step 1110, where a computing system may access a first grayscale image and a second grayscale image (or any other number of images). The two images may be a pair of stereo images (e.g., the first grayscale image and the second grayscale image may be simultaneously captured by, respectively, a first camera and a second camera having an overlapping field of view) or a pair of temporally-related images (e.g., captured sequentially by the same camera). The system may further access a third grayscale image, in which case the first and second grayscale images may be a pair of stereo images and the first and third grayscale images may be a pair of temporally-related images.

At step 1120, the system may generate a first color image and a second color image based on the first grayscale image and the second grayscale image, respectively. For example, the first and second color images may be generated by processing the first and second grayscale images, respectively, using a machine-learning model configured to colorize grayscale images. If additional grayscale images are to be colorized, the system may further generate a third color image based on a third grayscale image, a fourth color image based on a fourth grayscale image, and so on.

At step 1130, the system may generate affinity information based on the first grayscale image and the second grayscale image. The affinity information may identify relationships between pixels in each of the images. For example, the affinity information may indicate that a first collection of pixels in the first grayscale image are related. The affinity information may additionally or alternatively identify relationships between the pixels of different images. For example, the affinity information may indicate that the first collection of pixels in the first grayscale image is related to a second collection of pixels in the second grayscale image. As previously indicated, the first and second grayscale images may be a pair of stereo images or a pair of temporally-related images. In scenarios where a third grayscale image is to be colorized, the first and second grayscale images may be a pair of stereo images and the first and third grayscale images may be a pair of temporally-related images. In that case, the affinity information may further identify the relationships between the two temporally-related images. For example, the affinity information may indicate that the first collection of pixels in the first grayscale image is related to a third collection of pixels in the third grayscale image.

At step 1140, the system may modify the color of the first color image and the second color image based on the affinity information. Similarly, if a third grayscale image is to be colorized, the system may further modify the color of the corresponding third color image. The modification may improve color consistency for objects within each image. For example, if object (e.g., a table) appears in the first color image and the modified first color image, the object's color in the modified first color image may be more uniform than the object's color in the first color image (e.g., instead of depicting a table with patches of different colors, the modified image may depict a white table with substantially uniform color). Additionally or alternatively, the modification may improve color consistency for objects appearing in both the first and second color images. As an example, an object (e.g., a table, a person, etc.) may appear in each of the images. After color modification, the object's color in the modified first color image and the object's color in the modified second color image may be more similar than the object's color in the first color image and the object's color in the second color image. Such modification may be caused by the affinity information indicating that a first collection of pixels in the first grayscale image corresponding to the object is related to a second collection of pixels in the second grayscale image corresponding to the object. In a similar manner, the object's color in the modified first color image and the object's color in the modified third color image may be more similar than the object's color in the first color image and the object's color in the third color image. Again, the modification may be caused by the affinity information indicating that a first collection of pixels in the first grayscale image corresponding to the object is related to a third collection of pixels in the third grayscale image corresponding to the object.

At step 1150, the system may generate a first visual output based on the modified first color image and a second visual output based on the modified second color image. For example, the first and second visual outputs may be passthrough visualizations of the user's physical environment, in which case the modified first and second color images may be used as textures for rendering the passthrough visualizations. If the modified first and second color images are a pair of stereo images, the first and second visual outputs may be simultaneously displayed by the left and right screens of a stereo display. On the other hand, if the modified first and second color images are a pair of temporally-related images, the first and second visual outputs may be displayed sequentially on the same screen of a display (e.g., the left-eye screen).

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for colorizing grayscale images, including the particular steps of the method of FIG. 11, this disclosure contemplates any suitable method for colorizing grayscale images, including any suitable steps, which may include a subset of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
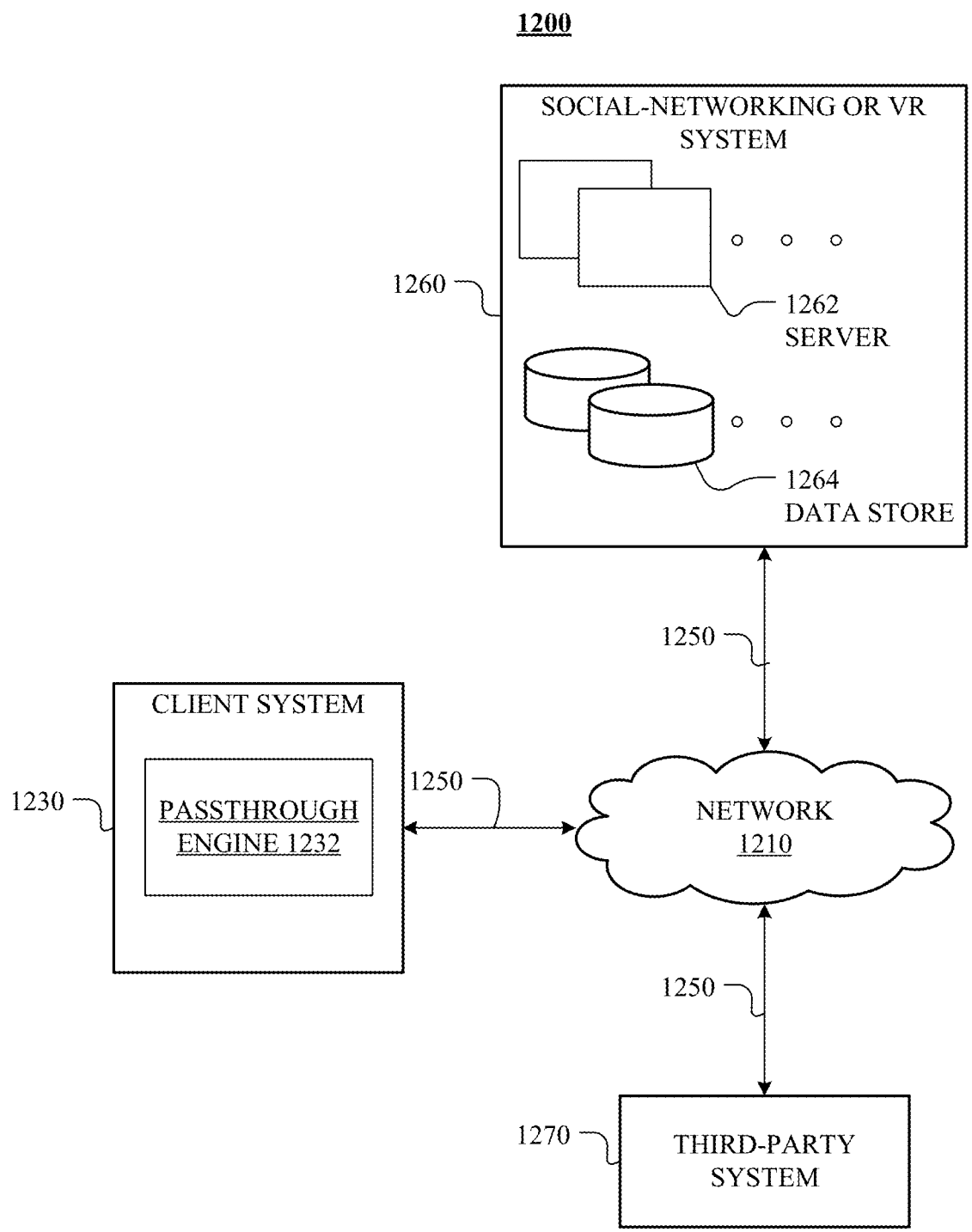
FIG. 12 illustrates an example network environment associated with a VR or social-networking system.

FIG. 12 illustrates an example network environment 1200 associated with a VR or social-networking system. Network environment 1200 includes a client system 1230, a VR or social-networking system 1260, and a third-party system 1270 connected to each other by a network 1210. Although FIG. 12 illustrates a particular arrangement of client system 1230, VR or social-networking system 1260, third-party system 1270, and network 1210, this disclosure contemplates any suitable arrangement of client system 1230, VR or social-networking system 1260, third-party system 1270, and network 1210. As an example and not by way of limitation, two or more of client system 1230, VR or social-networking system 1260, and third-party system 1270 may be connected to each other directly, bypassing network 1210. As another example, two or more of client system 1230, VR or social-networking system 1260, and third-party system 1270 may be physically or logically co-located with each other in whole or in part. Moreover, although FIG. 12 illustrates a particular number of client systems 1230, VR or social-networking systems 1260, third-party systems 1270, and networks 1210, this disclosure contemplates any suitable number of client systems 1230, VR or social-networking systems 1260, third-party systems 1270, and networks 1210. As an example and not by way of limitation, network environment 1200 may include multiple client system 1230, VR or social-networking systems 1260, third-party systems 1270, and networks 1210.

This disclosure contemplates any suitable network 1210. As an example and not by way of limitation, one or more portions of network 1210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1210 may include one or more networks 1210.

Links 1250 may connect client system 1230, social-networking system 1260, and third-party system 1270 to communication network 1210 or to each other. This disclosure contemplates any suitable links 1250. In particular embodiments, one or more links 1250 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1250, or a combination of two or more such links 1250. Links 1250 need not necessarily be the same throughout network environment 1200. One or more first links 1250 may differ in one or more respects from one or more second links 1250.

In particular embodiments, client system 1230 may be an electronic device including hardware, software, or embedded logic components or a combination of two or more such components and capable of carrying out the appropriate functionalities implemented or supported by client system 1230. As an example and not by way of limitation, a client system 1230 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1230. A client system 1230 may enable a network user at client system 1230 to access network 1210. A client system 1230 may enable its user to communicate with other users at other client systems 1230.

In particular embodiments, client system 1230 (e.g., an HMD) may include a passthrough engine 1232 to provide the passthrough feature described herein, and may have one or more add-ons, plug-ins, or other extensions. A user at client system 1230 may connect to a particular server (such as server 1262, or a server associated with a third-party system 1270). The server may accept the request and communicate with the client system 1230.

In particular embodiments, VR or social-networking system 1260 may be a network-addressable computing system that can host an online Virtual Reality environment or social network. VR or social-networking system 1260 may generate, store, receive, and send social-networking data, such as, for example, user-profile data, concept-profile data, social-graph information, or other suitable data related to the online social network. Social-networking or VR system 1260 may be accessed by the other components of network environment 1200 either directly or via network 1210. As an example and not by way of limitation, client system 1230 may access social-networking or VR system 1260 using a web browser, or a native application associated with social-networking or VR system 1260 (e.g., a mobile social-networking application, a messaging application, another suitable application, or any combination thereof) either directly or via network 1210. In particular embodiments, social-networking or VR system 1260 may include one or more servers 1262. Each server 1262 may be a unitary server or a distributed server spanning multiple computers or multiple datacenters. Servers 1262 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1262 may include hardware, software, or embedded logic components or a combination of two or more such components for carrying out the appropriate functionalities implemented or supported by server 1262. In particular embodiments, social-networking or VR system 1260 may include one or more data stores 1264. Data stores 1264 may be used to store various types of information. In particular embodiments, the information stored in data stores 1264 may be organized according to specific data structures. In particular embodiments, each data store 1264 may be a relational, columnar, correlation, or other suitable database. Although this disclosure describes or illustrates particular types of databases, this disclosure contemplates any suitable types of databases. Particular embodiments may provide interfaces that enable a client system 1230, a social-networking or VR system 1260, or a third-party system 1270 to manage, retrieve, modify, add, or delete, the information stored in data store 1264.

In particular embodiments, social-networking or VR system 1260 may store one or more social graphs in one or more data stores 1264. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1260 may provide users of the online social network the ability to communicate and interact with other users. In particular embodiments, users may join the online social network via social-networking or VR system 1260 and then add connections (e.g., relationships) to a number of other users of social-networking or VR system 1260 to whom they want to be connected. Herein, the term "friend" may refer to any other user of social-networking or VR system 1260 with whom a user has formed a connection, association, or relationship via social-networking or VR system 1260.

In particular embodiments, social-networking or VR system 1260 may provide users with the ability to take actions on various types of items or objects, supported by social-networking or VR system 1260. As an example and not by way of limitation, the items and objects may include groups or social networks to which users of social-networking or VR system 1260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 1260 or by an external system of third-party system 1270, which is separate from social-networking or VR system 1260 and coupled to social-networking or VR system 1260 via a network 1210.

In particular embodiments, social-networking or VR system 1260 may be capable of linking a variety of entities. As an example and not by way of limitation, social-networking or VR system 1260 may enable users to interact with each other as well as receive content from third-party systems 1270 or other entities, or to allow users to interact with these entities through an application programming interfaces (API) or other communication channels.

In particular embodiments, a third-party system 1270 may include one or more types of servers, one or more data stores, one or more interfaces, including but not limited to APIs, one or more web services, one or more content sources, one or more networks, or any other suitable components, e.g., that servers may communicate with. A third-party system 1270 may be operated by a different entity from an entity operating social-networking or VR system 1260. In particular embodiments, however, social-networking or VR system 1260 and third-party systems 1270 may operate in conjunction with each other to provide social-networking services to users of social-networking or VR system 1260 or third-party systems 1270. In this sense, social-networking or VR system 1260 may provide a platform, or backbone, which other systems, such as third-party systems 1270, may use to provide social-networking services and functionality to users across the Internet.

In particular embodiments, a third-party system 1270 may include a third-party content object provider. A third-party content object provider may include one or more sources of content objects, which may be communicated to a client system 1230. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1260 also includes user-generated content objects, which may enhance a user's interactions with social-networking or VR system 1260. User-generated content may include anything a user can add, upload, send, or "post" to social-networking or VR system 1260. As an example and not by way of limitation, a user communicates posts to social-networking or VR system 1260 from a client system 1230. Posts may include data such as status updates or other textual data, location information, photos, videos, links, music or other similar data or media. Content may also be added to social-networking or VR system 1260 by a third-party through a "communication channel," such as a newsfeed or stream.

In particular embodiments, social-networking or VR system 1260 may include a variety of servers, sub-systems, programs, modules, logs, and data stores. In particular embodiments, social-networking or VR system 1260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 1260 may also include suitable components such as network interfaces, security mechanisms, load balancers, failover servers, management-and-network-operations consoles, other suitable components, or any suitable combination thereof. In particular embodiments, social-networking or VR system 1260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1260 to one or more client systems 1230 or one or more third-party system 1270 via network 1210. The web server may include a mail server or other messaging functionality for receiving and routing messages between social-networking or VR system 1260 and one or more client systems 1230. An API-request server may allow a third-party system 1270 to access information from social-networking or VR system 1260 by calling one or more APIs. An action logger may be used to receive communications from a web server about a user's actions on or off social-networking or VR system 1260. In conjunction with the action log, a third-party-content-object log may be maintained of user exposures to third-party-content objects. A notification controller may provide information regarding content objects to a client system 1230. Information may be pushed to a client system 1230 as notifications, or information may be pulled from client system 1230 responsive to a request received from client system 1230. Authorization servers may be used to enforce one or more privacy settings of the users of social-networking or VR system 1260. A privacy setting of a user determines how particular information associated with a user can be shared. The authorization server may allow users to opt in to or opt out of having their actions logged by social-networking or VR system 1260 or shared with other systems (e.g., third-party system 1270), such as, for example, by setting appropriate privacy settings. Third-party-content-object stores may be used to store content objects received from third parties, such as a third-party system 1270. Location stores may be used for storing location information received from client systems 1230 associated with users. Advertisement-pricing modules may combine social information, the current time, location information, or other suitable information to provide relevant advertisements, in the form of notifications, to a user.

Figure 13:
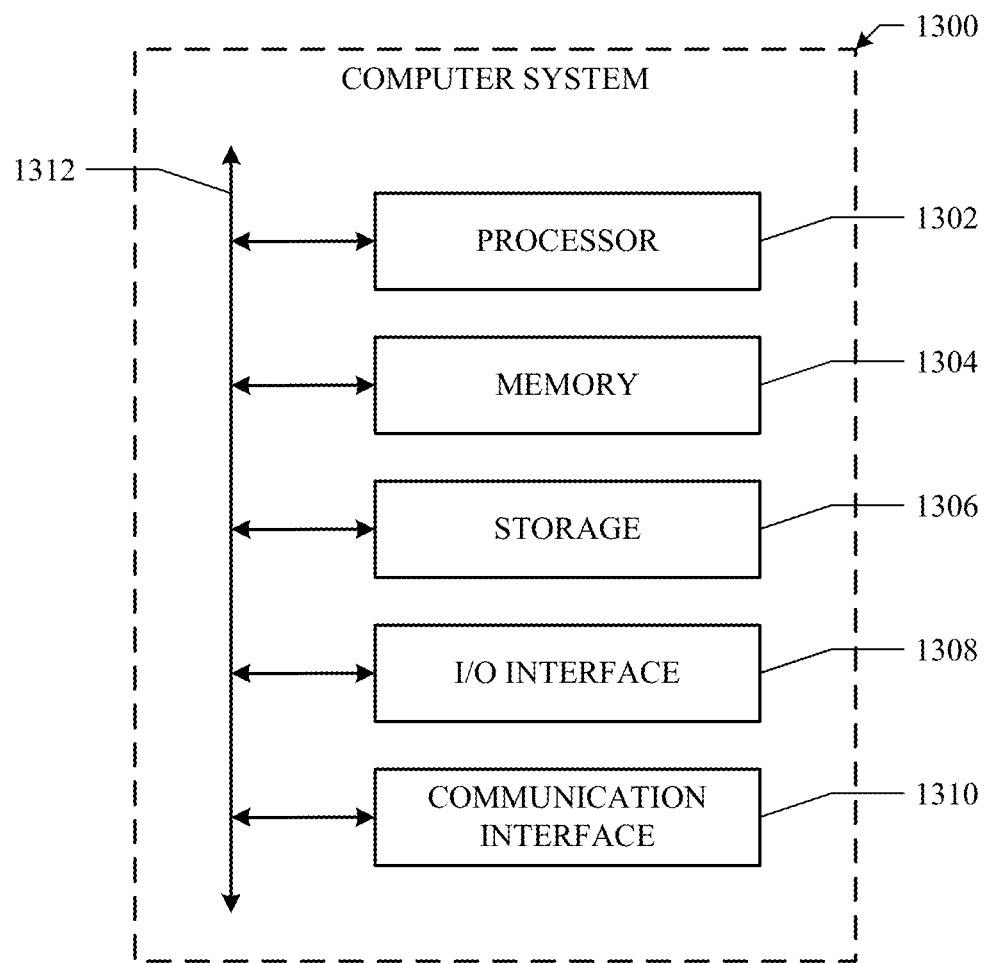
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system

1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   capturing a first grayscale image by a first camera of a device and a second grayscale image by a second camera of the device, wherein the first and second grayscale images are stereo images that are captured at a same time;
   accessing the first grayscale image and the second grayscale image that are captured by the first camera and second camera, respectively;
   generating, using a machine-learning model, a first color image corresponding to the first grayscale image and a second color image corresponding to the second grayscale image, wherein the first and second color images include color inconsistencies;
   generating affinity information, for resolving the color inconsistencies in the first and second color images, based on comparison of pixels between the first grayscale image and the second grayscale image, the affinity information identifying relationships between pixels of the first grayscale image and pixels of the second grayscale image;
   modifying the first color image and the second color image, which are generated using the machine-learning model, based on the relationships between the pixels of the first grayscale image and the pixels of the second grayscale image, wherein the modification resolves the color inconsistencies in the first color image and the second color image; and
   generating a first visual output based on the modified first color image and a second visual output based on the modified second color image.

2. The method of claim 1, wherein the machine-learning model is trained to colorize grayscale images, and wherein the machine-learning is trained based on a set of training samples, each training sample comprising a particular grayscale image and a corresponding ground-truth colored image of the particular grayscale image.

3. The method of claim 1, wherein:
   an object appears in the first color image and the second color image, wherein the object's color is inconsistent between the first color image and the second color image prior to the modification; and
   the object's color between the modified first color image and the modified second color image is more consistent than the object's color between the first color image and the second color image prior to the modification.

4. The method of claim 1, wherein:
   an object appears in the first grayscale image, the first color image, the second grayscale image, and the second color image; and
   the object's color in the modified first color image and the object's color in the modified second color image are more similar than the object's color in the first color image and the object's color in the second color image.

5. The method of claim 4, wherein the affinity information indicates that a first collection of pixels in the first grayscale image corresponding to the object is related to a second collection of pixels in the second grayscale image corresponding to the object.

6. The method of claim 1, wherein the affinity information indicates that a first collection of pixels in the first grayscale image are related.

7. The method of claim 6, wherein:
   the first grayscale image and the second grayscale image are simultaneously captured by, respectively, the first camera and the second camera having an overlapping field of view; and
   the affinity information indicates that the first collection of pixels in the first grayscale image is related to a second collection of pixels in the second grayscale image.

8. The method of claim 7, further comprising:
   generating a third color image based on a third grayscale image, the third grayscale image and the first grayscale image being captured sequentially by the first camera;
   modifying color of the third color image based on the affinity information; and
   outputting the modified third color image;
   wherein generating the affinity information is further based on the third grayscale image; and
   wherein the affinity information indicates that the first collection of pixels in the first grayscale image is related to a third collection of pixels in the third grayscale image.

9. The method of claim 1, further comprising:
   displaying the first visual output and the second visual output simultaneously on a stereo display.

10. The method of claim 1, wherein the device is a head-mounted display device.

11. One or more computer-readable non-transitory storage media embodying software that is operable when executed to:
- capture a first grayscale image by a first camera of a device and a second grayscale image by a second camera of the device, wherein the first and second grayscale images are stereo images that are captured at a same time;
- access the first grayscale image and the second grayscale image that are captured by the first camera and second camera, respectively;
- generate, using a machine-learning model, a first color image corresponding to the first grayscale image and a second color image corresponding to the second grayscale image, wherein the first and second color images include color inconsistencies;
- generate affinity information, for resolving the color inconsistencies in the first and second color images, based on comparison of pixels between the first grayscale image and the second grayscale image, the affinity information identifying relationships between pixels of the first grayscale image and pixels of the second grayscale image;
- modify the first color image and the second color image, which are generated using the machine-learning model, based on the relationships between the pixels of the first grayscale image and the pixels of the second grayscale image, wherein the modification resolves the color inconsistencies in the first color image and the second color image; and
- generate a first visual output based on the modified first color image and a second visual output based on the modified second color image.

12. The media of claim 11, wherein:
- an object appears in the first grayscale image, the first color image, the second grayscale image, and the second color image; and
- the object's color in the modified first color image and the object's color in the modified second color image are more similar than the object's color in the first color image and the object's color in the second color image.

13. The media of claim 11, wherein the affinity information indicates that a first collection of pixels in the first grayscale image are related.

14. The media of claim 13, wherein:
- the first grayscale image and the second grayscale image are simultaneously captured by, respectively, the first camera and the second camera having an overlapping field of view; and
- the affinity information indicates that the first collection of pixels in the first grayscale image is related to a second collection of pixels in the second grayscale image.

15. The media of claim 14, wherein the software is further operable when executed to:
- generate a third color image based on a third grayscale image, the third grayscale image and the first grayscale image being captured sequentially by the first camera;
- modify color of the third color image based on the affinity information; and
- output the modified third color image;
- wherein generating the affinity information is further based on the third grayscale image; and
- wherein the affinity information indicates that the first collection of pixels in the first grayscale image is related to a third collection of pixels in the third grayscale image.

16. A system comprising:
- one or more processors; and
- one or more computer-readable non-transitory storage media coupled to one or more of the processors and comprising instructions operable when executed by one or more of the processors to cause the system to:
- capture a first grayscale image by a first camera of a device and a second grayscale image by a second camera of the device, wherein the first and second grayscale images are stereo images that are captured at a same time;
- access the first grayscale image and the second grayscale image that are captured by the first camera and second camera, respectively;
- generate, using a machine-learning model, a first color image corresponding to the first grayscale image and a second color image corresponding to the second grayscale image, wherein the first and second color images include color inconsistencies;
- generate affinity information, for resolving the color inconsistencies in the first and second color images, based on comparison of pixels between the first grayscale image and the second grayscale image, the affinity information identifying relationships between pixels of the first grayscale image and pixels of the second grayscale image;
- modify the first color image and the second color image, which are generated using the machine-learning model, based on the relationships between the pixels of the first grayscale image and the pixels of the second grayscale image, wherein the modification resolves the color inconsistencies in the first color image and the second color image; and
- generate a first visual output based on the modified first color image and a second visual output based on the modified second color image.

17. The system of claim 16, wherein:
- an object appears in the first grayscale image, the first color image, the second grayscale image, and the second color image; and
- the object's color in the modified first color image and the object's color in the modified second color image are more similar than the object's color in the first color image and the object's color in the second color image.

18. The system of claim 16, wherein the affinity information indicates that a first collection of pixels in the first grayscale image are related.

19. The system of claim 18, wherein:
- the first grayscale image and the second grayscale image are simultaneously captured by, respectively, the first camera and the second camera having an overlapping field of view; and
- the affinity information indicates that the first collection of pixels in the first grayscale image is related to a second collection of pixels in the second grayscale image.

20. The system of claim 19, wherein the one or more of the processors are further operable when executing the instructions to cause the system to:
- generate a third color image based on a third grayscale image, the third grayscale image and the first grayscale image being captured sequentially by the first camera;
- modify color of the third color image based on the affinity information; and
- output the modified third color image;
- wherein generating the affinity information is further based on the third grayscale image; and wherein the affinity information indicates that the first collection of pixels in the first grayscale image is related to a third collection of pixels in the third grayscale image.

\* \* \* \* \*

UNITED STATES PATENT AND TRADEMARK OFFICE
CERTIFICATE OF CORRECTION

| | | |
|---|---|---|
| PATENT NO. | : 11,451,758 B1 | Page 1 of 1 |
| APPLICATION NO. | : 16/789019 | |
| DATED | : September 20, 2022 | |
| INVENTOR(S) | : Gaurav Chaurasia et al. | |

It is certified that error appears in the above-identified patent and that said Letters Patent is hereby corrected as shown below:

On the Title Page

At item (72) Inventors:
"Gaurav Chaurasia Zurich, (CH); Alexander Sorkine Hornung, Zurich (CH); David Novotny, London (GB); Nikola Dodik, Zurich (CH)"
Should read as:
-- Gaurav Chaurasia Zurich, (CH); Alexander Sorkine Hornung, Zurich (CH); David Novotny, London (GB); Ana Dodik, Zurich (CH) --

Signed and Sealed this
Fourth Day of June, 2024

Katherine Kelly Vidal
*Director of the United States Patent and Trademark Office*